(12) United States Patent
Fehri et al.

(10) Patent No.: US 9,331,882 B2
(45) Date of Patent: May 3, 2016

(54) CREST FACTOR REDUCTION OF CARRIER AGGREGATED SIGNALS

(71) Applicant: Telefonaktiebolaget L M Ericsson (publ), Stockholm (SE)

(72) Inventors: Bilel Fehri, Waterloo (CA); Slim Boumaiza, Waterloo (CA); Edward Sich, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 143 days.

(21) Appl. No.: 14/319,599

(22) Filed: Jun. 30, 2014

(65) Prior Publication Data
US 2014/0362951 A1    Dec. 11, 2014

Related U.S. Application Data

(63) Continuation-in-part of application No. 14/178,536, filed on Feb. 12, 2014.

(60) Provisional application No. 61/831,339, filed on Jun. 5, 2013, provisional application No. 61/886,317, filed on Oct. 3, 2013.

(51) Int. Cl.
*H04B 1/04* (2006.01)
*H04L 27/26* (2006.01)
*H04L 5/00* (2006.01)

(52) U.S. Cl.
CPC .......... *H04L 27/2623* (2013.01); *H04B 1/0475* (2013.01); *H04L 5/001* (2013.01)

(58) Field of Classification Search
USPC .......................................... 455/115.1, 127.1
See application file for complete search history.

(56) References Cited

U.S. PATENT DOCUMENTS 6,765,899 B1 * 7/2004 Lundh .................... H04B 1/707
                                                                370/342
7,194,039 B2   3/2007 Hunton
(Continued)

FOREIGN PATENT DOCUMENTS

WO        2013066639 A1      5/2013

OTHER PUBLICATIONS

Author Unknown, "LTE; Evolved Universal Terrestrial Radio Access (E-UTRA); Base Station (BS) radio transmission and reception," Technical Specification 36.104, Version 11.3.1, Release 11, Feb. 2013, European Telecommunications Standards Institute (ETSI), 135 pages.

(Continued)

*Primary Examiner* — Blane J Jackson
(74) *Attorney, Agent, or Firm* — Withrow & Terranova, PLLC

(57) ABSTRACT

The present disclosure advantageously provides methods and systems for crest factor reduction of multi-standard carrier aggregated signals. In one embodiment, a method of providing crest factor reduction for a carrier aggregated signal is provided. In one embodiment, the method comprises estimating a peak of a carrier aggregated signal based on a summation of instantaneous amplitudes of baseband representations of a number of component carriers of the carrier aggregated signal. The number of component carriers of the carrier aggregated signal is greater than or equal to 2. The method further comprises clipping the baseband representations of the component carriers if the estimated peak of the carrier aggregated signal is greater than a predefined clipping threshold.

28 Claims, 16 Drawing Sheets

(56) References Cited

U.S. PATENT DOCUMENTS

| | | | |
|---|---|---|---|
| 7,313,373 B1 * | 12/2007 | Laskharian | H04B 1/04 455/127.1 |
| 7,496,145 B2 | 2/2009 | Greenwood et al. | |
| 9,215,120 B2 * | 12/2015 | Rexberg | H04L 27/2624 |
| 2005/0281345 A1 * | 12/2005 | Obernosterer | H04L 27/2623 375/260 |
| 2006/0171486 A1 | 8/2006 | Tan | |
| 2007/0201582 A1 | 8/2007 | Okada et al. | |
| 2010/0027690 A1 | 2/2010 | Liang et al. | |
| 2010/0150256 A1 * | 6/2010 | Morris | H04L 25/49 375/260 |
| 2011/0261896 A1 | 10/2011 | Haddad | |
| 2013/0163512 A1 | 6/2013 | Rexberg et al. | |
| 2014/0198863 A1 * | 7/2014 | Terry | H04L 27/2623 375/260 |

OTHER PUBLICATIONS

Bathich, K. et al., "Frequency response analysis and bandwidth extension of the Doherty amplifier," IEEE Transactions on Microwave Theory & Techniques, vol. 59, No. 4, Apr. 2011, IEEE, pp. 934-944.

Bauml, R.W. et al., "Reducing the Peak-to-Average Power Ratio of Multicarrier Modulation by Selected Mapping," Electronics Letters, vol. 32, Issue 22, Oct. 1996, Institution of Engineering and Technology, 5 pages.

Han, S.H. et al., "An overview of peak-to-average power ratio reduction techniques for multicarrier transmission," IEEE Wireless Communications, vol. 12, Issue 2, Apr. 2005, IEEE, pp. 56-65.

Hanzo, L. et al., "Chapter 11. Advanced Peak Factor Reduction Techniques," from OFDM and MC-CDMA for Broadband Multi-User Communications, WLANs, and Broadcasting, Sep. 2003, Wiley-IEEE Press, pp. 286-300.

Helaoui, M. et al., "Power and Efficiency Enhancement of 3G Multicarrier Amplifiers Using Digital Signal Processing With Experimental Validation," IEEE Transactions on Microwave Theory and Techniques, vol. 54, No. 4, Apr. 2006, IEEE, pp. 1396-1404.

Ho, W.S. et al., "Peak-to-average power reduction using partial transmit sequences: a suboptimal approach based on dual layered phase sequencing," IEEE Transactions on Broadcasting, vol. 49, Issue 2, Jun. 2003, IEEE, pp. 225-231.

Huang, X. et al., "Companding transform for reduction in peak-to-average power ratio of OFDM signals," IEEE Transactions on Wireless Communications, vol. 3, Issue 6, Nov. 2004, IEEE, pp. 2030-2039.

Krongold, B.S. et al., "PAR reduction in OFDM via active constellation extension," IEEE International Conference on Acoustics, Speech, and Signal Processing (ICASSP), Apr. 2003, IEEE, 4 pages.

Litsyn, S., "8. Methods to decrease peak power in MC systems," from Peak Power Control in Multicarrier Communications, Jan. 15, 2007, Cambridge University Press, pp. 224-240.

Ochiai, H. et al., "Performance analysis of deliberately clipped OFDM signals," IEEE Transactions on Communications, vol. 50, Issue 1, Jan. 2002, pp. 89-101.

Saul, A., "Generalized active constellation extension for peak reduction in OFDM systems," IEEE International Conference on Communications, vol. 3, May 2005, IEEE, pp. 1974-1979.

Fehri, Bilel, et al., "Joint Dual-band Crest Factor Reduction and Digital Predistortion of Power Amplifiers Driven by Inter-Band Carrier Aggregated Signals," IEEE MTT-S International Microwave Symposium (IMS), Jun. 1-6, 2014, Tampa, Florida, IEEE, pp. 1-4.

Gilabert, Pere L., et al., "3D Digital Predistortion for Dual-Band Envelope Tracking Power Amplifiers," Asia-Pacific Microwave Conference Proceedings (APMC), Nov. 5-8, 2013, Seoul, Korea, IEEE, pp. 734-736.

Srivastava, Gauraw Kumar, et al., "Crest Factor Reduction for Carrier Aggregated OFDM Systems," 20th International Conference on Software, Telecommunications and Computer Networks (SoftCOM), Sep. 11-13, 2012, Split, Croatia, IEEE, 6 pages.

Notice of Allowance for U.S. Appl. No. 14/178,536, mailed Sep. 30, 2015, 7 pages.

International Search Report and Written Opinion for International Patent Application No. PCT/IB2015/054488, mailed Sep. 23, 2015, 11 pages.

International Search Report and Written Opinion for International Patent Application No. PCT/IB2014/061059, mailed Sep. 16, 2014, 11 pages.

* cited by examiner

CREST FACTOR REDUCTION OF CARRIER AGGREGATED SIGNALS

RELATED APPLICATIONS

This application is a Continuation-in-Part of U.S. application Ser. No. 14/178,536, filed Feb. 12, 2014, entitled "CREST FACTOR REDUCTION OF INTER-BAND CARRIER AGGREGATED SIGNALS," which is related to and claims priority to U.S. Provisional Application Ser. No. 61/831,339, filed Jun. 5, 2013, entitled "CREST FACTOR REDUCTION OF INTER-BAND CARRIER AGGREGATED SIGNALS", and U.S. Provisional Application Ser. No. 61/886,317, filed Oct. 3, 2013, entitled "CREST FACTOR REDUCTION OF INTER-BAND MULTI-STANDARD CARRIER AGGREGATED SIGNALS", the entirety of which are incorporated herein by reference.

FIELD OF THE DISCLOSURE

This written description is directed to radio transmitters, and in particular, to crest factor reduction of carrier aggregated signals in radio transmitters of a communication system.

BACKGROUND

An absence of frequency spectrum bands that can support wide transmission bandwidths gives rise to intra-band or inter-band aggregation of multiple carriers according to specific sets of technical requirements. Such carrier aggregated signals have characteristics, such as high peak to average power ratio (PAPR), also commonly referred to as crest factor (CF), and wide bandwidth. The amplification of these carrier aggregated signals by a single power amplifier (PA) poses several challenges. A PA is required to maintain good power efficiency over multiple frequency bands. This has motivated recent research attempts to develop high efficiency, multi-band and broadband devices such as Doherty PAs and envelope tracking systems. In addition, due to the high CF of the carrier aggregated signals, these PAs are often required to operate in the large back off region from their peak power to meet linearity requirements. Consequently, these PAs yield poor power efficiency.

Several techniques have been devised for crest factor reduction (CFR) of single band signals and consequently enhance PA efficiency and reduce the dynamic-range requirement imposed on digital to analog converters. These techniques can be divided into two categories: distortion-less methods (commonly called linear CFR techniques), such as selected mapping, partial transmit sequence, tone injection, tone reservation, and coding; and distortion-based methods (also called nonlinear CFR techniques) such as clipping/windowing, companding, active constellation extension (ACE), and generalized ACE methods.

Linear techniques can achieve greater CF reduction than their nonlinear counterparts without altering signal quality. However, linear techniques usually require modifications to the receiver that may be incompatible with existing communication systems. Linear techniques have been applied to multicarrier/single-standard signals through proper modulation and coding. However, the generalization of linear techniques to carrier aggregated signals is not possible due to the dissimilarity between the modulation schemes employed in each carrier.

The nonlinear CFR techniques are generally carefully applied to obtain the highest possible CF reduction while not exceeding the distortion threshold. These techniques, and in particular, the clipping/windowing technique, have been applied to multi-carrier signals co-located in the same spectrum band. However application of clipping/windowing techniques to carrier aggregated signals, especially when each carrier is located in different and widely spaced frequency bands, is very challenging because the clipping/windowing techniques may require very high, and thus, impractical sampling rates.

A carrier aggregated signal over two bands, such as shown in FIG. 1, can be expressed as $$x(t) = x_1(t) + x_2(t) = \tilde{x}_1(t)e^{j\omega_1 t} + \tilde{x}_2(t)e^{j\omega_2 t} \quad (1)$$

where $x(t)$ is the carrier aggregated signal, $x_1(t)$ and $x_2(t)$ are the mixed mode signals in each band, and $\tilde{x}_1(t)$ and $\tilde{x}_2(t)$ denote the baseband envelopes of $x_1(t)$ and $x_2(t)$ around the angular frequencies $\omega_1$ and $\omega_2$, respectively. As shown in FIG. 1, the individual signals $x_1(t)$ and $x_2(t)$ have bandwidths B1 and B2, respectively, and are separated by a frequency gap S.

The carrier aggregated signal can be represented as a broadband signal with an angular carrier frequency $$\left(\frac{\omega_1 + \omega_2}{2}\right)$$

as given by:

$$\begin{aligned} x(t) &= x_1(t) + x_2(t) \\ &= \tilde{x}(t) \cdot e^{j\frac{\omega_1 + \omega_2}{2}t} \\ &= \left(\tilde{x}_1(t)e^{j\frac{\omega_1 - \omega_2}{2}t} + \tilde{x}_2(t)e^{j\frac{\omega_2 - \omega_1}{2}t}\right)e^{j\frac{\omega_1 + \omega_2}{2}t} \end{aligned} \quad (2)$$

where $\tilde{x}(t)$ is the baseband envelope of the carrier aggregated signal. The baseband envelope, $x(t)$, can be amplified using a dual-band or broadband PA instead of two single-band PAs in order to reduce a transmitter's cost and size. The carrier aggregation can result in an increased CF, which unless reduced, will require the designer to inefficiently operate the dual-band PA in its large back-off region.

The classical clipping/windowing nonlinear CFR technique can be applied to $\tilde{x}(t)$. In such case the CFR module may be a single-input single-output (SISO) unit that processes a digitized version of $x(t)$ which is sampled at a frequency $f'_s$, where $f'_s \geq 2 \cdot (S + \max(B_1/2, B_2/2))$, and S, $B_1$ and $B_2$ represent the frequency spacing and the bandwidths of the two signals, respectively. The digitized baseband signal $\tilde{x}(n')$ can then be expressed as follows:

$$\tilde{x}(n') = \tilde{x}_1(n')e^{j\frac{\omega_1 - \omega_2}{2}\frac{n'}{f_{s'}}} + \tilde{x}_2(n')e^{j\frac{\omega_2 - \omega_1}{2}\frac{n'}{f_{s'}}} \quad (3)$$

The classical clipping/windowing method consists of monitoring the instantaneous amplitude of the signal envelope, and limiting it to a preset threshold to obtain the targeted CF. A device 10 for implementing the classical clipping/windowing method is shown in FIG. 2. As can be seen, in addition to the clipping 12 and filtering modules 14, the SISO CFR of FIG. 2 includes an up-sampler 16, a digital up-converter 18, a down-sampler 20 and a down-converter 22. As this technique is a nonlinear operation, inband distortions and out of band spectrum regrowth are induced. In order to achieve an acceptable adjacent channel power ratio (ACPR), the clipped signal is filtered. The clipping threshold is set so that the CF is reduced while conforming to error vector magnitude (EVM) and ACPR specifications.

The frequency spacing S between the two carriers is generally significantly greater than the bandwidths of $x_1(t)$ and $x_2(t)$, i.e. $B_1$ and $B_2$, especially in the case of inter-band aggregation scenarios. Hence, $f'_s$ would need to be considerably larger than the frequencies $f_{s1}$ and $f_{s2}$ needed to digitize $\tilde{x}_1(t)$ and $\tilde{x}_2(t)$, respectively ($f_{s1} \geq 2 \cdot B_1$, $f_{s2} \geq 2 \cdot B_2$).

For example, assume a carrier aggregated signal is composed of a 15 MHz wide band code division multiple access (WCDMA) signal around 2.1 GHz and a 10 MHz long term evolution (LTE) signal centered in 2.4 GHz. For such a combination, the minimum theoretical sampling frequency $f'_s$ must be higher than 610 MHz. This sampling frequency is significantly higher than the sampling frequencies needed to represent the WCDMA and LTE signals individually. The direct application of the SISO clipping/windowing to $\tilde{x}(n')$ is thus seen to imply a high and impractical sampling rate. The high sampling rate requirement associated with the conventional clipping and windowing approach makes this solution sub-optimal in the context of inter-band carrier aggregated signals.

SUMMARY

The present disclosure advantageously provides methods and systems for crest factor reduction of multi-standard carrier aggregated signals. In one embodiment, a method of providing crest factor reduction for a carrier aggregated signal is provided. In one embodiment, the method comprises estimating a peak of a carrier aggregated signal based on a summation of instantaneous amplitudes of baseband representations of a number of component carriers of the carrier aggregated signal. The number of component carriers of the carrier aggregated signal is greater than or equal to 2. The method further comprises clipping the baseband representations of the component carriers if the estimated peak of the carrier aggregated signal is greater than a predefined clipping threshold.

In one embodiment, estimating the peak of the carrier aggregated signal comprises determining the instantaneous amplitudes of the baseband representations of the component carriers of the carrier aggregated signal and summing the instantaneous amplitudes of the baseband representations of the plurality of component carriers of the carrier aggregated signal to provide the estimated peak of the carrier aggregated signal.

Further, in one embodiment, clipping the baseband representations of the component carriers comprises applying equal peak reduction to each component carrier of the plurality of component carriers if the estimated peak of the carrier aggregated signal is greater than the predefined clipping threshold. In one embodiment, the equal peak reduction is defined as (S−C)/2 where S is the summation of the instantaneous amplitudes of the baseband representations of the component carriers of the carrier aggregated signal and C is the predefined clipping threshold.

In another embodiment, clipping the baseband representations of the component carriers comprises clipping the baseband representations of the component carriers according to a crest factor reduction scheme that accounts for different error vector magnitude (EVM) requirements for the component carriers, if the estimated peak of the carrier aggregated signal is greater than the predefined clipping threshold. In one particular embodiment, clipping the baseband representations of the component carriers according to the crest factor reduction scheme that accounts for different EVM requirements for the component carriers comprises clipping the baseband representations of the plurality of component carriers according to:

$$\forall k \in \{1 \ldots N\}, \text{If } \left(S = \sum_{i=1}^{N} G_i \cdot |\tilde{x}_i(t)|\right) > C$$

$$= > |\tilde{x}_{k\_clipped}(n)| = G_k \cdot |\tilde{x}_k(n)| - \alpha_k \cdot (S - C)$$

where C is the predefined clipping threshold, $\tilde{x}_{i\_clipped}(n)$ is the clipped baseband representation of the component carrier, and $a_1, \ldots, a_N$ are peak reduction factors that satisfy the condition $\sum_{i=1}^{N} a_i = 1$.

In another embodiment, estimating the peak of the carrier aggregated signal comprises determining the instantaneous amplitudes of the baseband representations of the component carriers of the carrier aggregated signal, weighting the instantaneous amplitudes according to average power levels of the component carriers of the carrier aggregated signal, and summing the weighted instantaneous amplitudes of the baseband representations of the component carriers of the carrier aggregated signal to provide the estimated peak of the carrier aggregated signal. In one embodiment, weighting the instantaneous amplitudes comprises, for each component carrier, computing the weighted instantaneous amplitude for the component carrier as:

$$G_i \cdot |\tilde{x}_i(n)|,$$

where $\tilde{x}_i(n)$ is the baseband representation of the component carrier and $G_i$ is a weighting factor for the component carrier defined as:

$$G_i = \sqrt{\frac{P_i}{\text{mean}(|\tilde{x}_i(n)|^2 / 100)}},$$

where $P_i$ is the average power level of the component carrier.

Further, in one embodiment, clipping the baseband representations of the component carriers comprises clipping the baseband representations of the component carriers according to a crest factor reduction scheme that accounts for different average power levels for the plurality of component carriers if the estimated peak of the carrier aggregated signal is greater than the predefined clipping threshold. In one embodiment, clipping the baseband representations of the component carriers according to the crest factor reduction scheme that accounts for different average power levels for the component carriers comprises clipping the baseband representations of the component carriers according to:

$$\forall k \in \{1 \ldots N\}, \text{If } \left(S = \sum_{i=1}^{N} G_i \cdot |\tilde{x}_i(t)|\right) > C$$

$$= > |\tilde{x}_{k\_clipped}(n)| = \frac{G_k \cdot |\tilde{x}_k(t)|}{S} \cdot C$$

where C is the predefined clipping threshold and $\tilde{x}_{i\_clipped}(n)$ is the clipped baseband representation of the component carrier.

In one embodiment, clipping the baseband representations of the component carriers according to the crest factor reduction scheme that accounts for different average power levels for the component carriers comprises clipping the baseband representations of the component carriers according to:

$$\forall k \in \{1 \ldots N\}, \text{If } \left(S = \sum_{i=1}^{N} G_i \cdot |\tilde{x}_i(t)|\right) > C$$

$$= > |\tilde{x}_{k\_clipped}(n)| = G_k \cdot |\tilde{x}_k(n)| - (S - C)$$

where C is the predefined clipping threshold and $\tilde{x}_{i\_clipped}(n)$ is the clipped baseband representation of the component carrier.

In one embodiment, clipping the baseband representations of the component carriers comprises clipping the baseband representations of the component carriers according to a crest factor reduction scheme that accounts for both different average power levels for the component carriers and different EVM requirements for the component carriers, if the estimated peak of the carrier aggregated signal is greater than the predefined clipping threshold. In one embodiment, clipping the baseband representations of the component carriers according to a crest factor reduction scheme that accounts for both different average power levels for the component carriers and different EVM requirements comprises clipping the baseband representations of the component carriers according to:

$$\forall k \in \{1 \ldots N\}, \text{If } \left(S = \sum_{i=1}^{N} G_i \cdot |\tilde{x}_i(t)|\right) > C$$

$$= > |\tilde{x}_{k\_clipped}(n)| = G_k \cdot |\tilde{x}_k(n)| - \alpha_k \cdot (S - C)$$

where C is the predefined clipping threshold, $\tilde{x}_{i\_clipped}(n)$ is the clipped baseband representation of the component carrier, and $a_1, \ldots, a_N$ are peak reduction factors that satisfy the condition $\Sigma_{i=1}^{N} a_1 = 1$.

In one embodiment, a crest factor reduction system for a carrier aggregated signal is provided. In one embodiment, the crest factor reduction system comprises a signal amplitude estimator and clipping circuitry. The signal amplitude estimator is configured to estimate a peak of a carrier aggregated signal comprising a number of component carriers, where the number of component carriers is greater than or equal to 2. The signal amplitude estimator is configured to estimate the peak of the carrier aggregated signal based on a summation of instantaneous amplitudes of baseband representations of the component carriers. The clipping circuitry is configured to clip the baseband representations of the component carriers if the estimated peak of the carrier aggregated signal is greater than a predefined clipping threshold.

According to one aspect, the disclosure provides a method of reducing a crest factor of inter-band carrier aggregated signals, the inter-band carrier signals comprising a plurality of carrier signals. The method includes calculating the amplitude of each of the plurality of carrier signals of the inter-band carrier aggregated signals. An estimate of an envelope of a combination of the carrier signals is produced based on a sum of the calculated amplitudes of the plurality of carrier signals. The estimate of the envelope of the combination of the carrier signals is compared to a clipping threshold to determine whether to clip each of the plurality of carrier signals.

According to this aspect, in some embodiments, a ratio of the calculated amplitude of a first carrier signal of the plurality of carrier signals to the estimated sum of the amplitudes of each of the plurality of carrier signals is formed. The ratio is multiplied by the clipping threshold to clip the first carrier signal of the plurality of carrier signals. In some embodiments, a first carrier signal of the plurality of carrier signals is modulated as a wideband code division multiple access (WCDMA) carrier signal and a second carrier signal of the plurality of carrier signals is modulated as a long term evolution (LTE) carrier signal. In some embodiments, the method further includes filtering each clipped carrier signal of the plurality of carrier signals to reduce out of band spectrum regrowth. In some embodiments, the method includes clipping each carrier signal of the plurality of carrier signals separately. In some embodiments, a quantity of the plurality of carrier signals exceeds two. In some embodiments, the method further includes sampling each of the plurality of carrier signals at a rate that is at least twice a maximum bandwidth of the bandwidths of the plurality of carrier signals. The sampling rate may be substantially less than a least frequency spacing between any two carrier signals.

According to another aspect, the disclosure provides an apparatus for reducing a crest factor of inter-band carrier aggregated signals, the inter-band carrier aggregated signals comprising a plurality of carrier signals. The apparatus includes a plurality of signal amplitude calculators, one for each of the plurality of carrier signals. Each of the plurality of signal amplitude calculators is configured to calculate an amplitude of a corresponding carrier signal of the plurality of carrier signals. An adder is configured to add the calculated carrier signal amplitudes to produce a composite signal that is an estimate of an envelope of the plurality of carrier signals. A plurality of clippers, one for each of the plurality of carrier signals, are configured to perform a clipping operation on a respective one of the plurality of carrier signals.

According to this aspect, in some embodiments, performance of the clipping operation of a clipper is contingent on the composite signal exceeding a clipping threshold. In some embodiments, the clipping is based on a ratio of a calculated amplitude of the respective one of the plurality of carrier signals to the composite signal, and the ratio is multiplied by the clipping threshold to clip the respective one of the plurality of carrier signals. In some embodiments, a first carrier signal of the plurality of carrier signals is modulated according to a first modulation scheme and a second carrier signal of the plurality of carrier signals is modulated according to a second modulation scheme different from the first modulation scheme. In some embodiments, the sampling rate is substantially less than a closest spacing between any two carrier signals of the plurality of carrier signals. In some embodiments, each carrier is sampled at a rate that is substantially less than a closest spacing between any two carrier signals of the plurality of carrier signals.

According to another aspect, the disclosure provides a crest factor reduction circuit. The circuit includes a plurality of inputs, one input for each of a plurality of carrier signals. The circuit also includes a plurality of signal amplitude calculators. Each signal amplitude calculator is coupled to a different one of the plurality of inputs to receive a different one of the plurality of carrier signals and is configured to calculate an amplitude of the received carrier signal. An adder is configured to add the calculated amplitudes from the plurality of signal amplitude calculators to produce a composite signal producing an estimate of an envelope of the individual carrier signal amplitude estimates. A comparator is configured to compare the composite signal to a threshold to determine whether to clip amplitudes of the plurality of carrier signals.

According to this aspect, in some embodiments, the circuit further includes a clipper for each carrier signal of the plurality of carrier signals to clip an amplitude of the corresponding carrier signal if the composite signal exceeds the threshold. In some embodiments, each clipper forms a ratio of an estimated amplitude of a carrier signal of the plurality of carrier signals to the composite signal and multiplies the ratio by the threshold to clip the carrier signal. In some embodiments, the circuit includes a sampler to sample each carrier signal of the plurality of carrier signals at a rate that is substantially less than a least frequency spacing between any two carrier signals of the plurality of carrier signals. In some embodiments, the circuit includes a low pass filter applied to each clipped signal to reduce spectrum regrowth due to the clipping.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
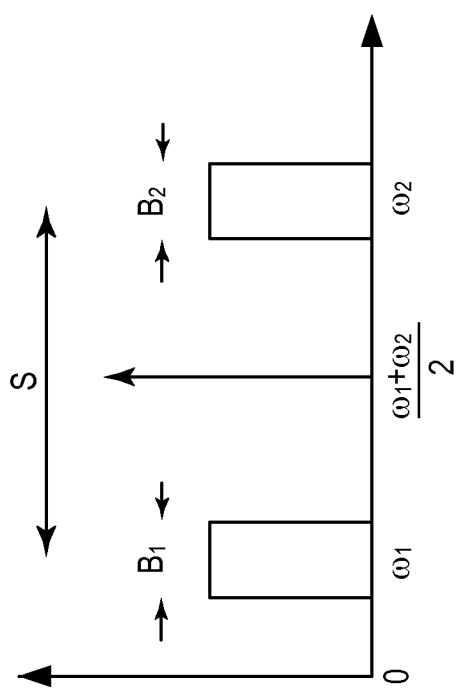
FIG. 1 is a diagram of two carrier signals separated by a frequency span.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing in detail exemplary embodiments that are in accordance with the present disclosure, it is noted that the embodiments reside primarily in combinations of apparatus components and processing steps related to crest factor reduction of inter-band multi-standard carrier aggregated signals. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 3:
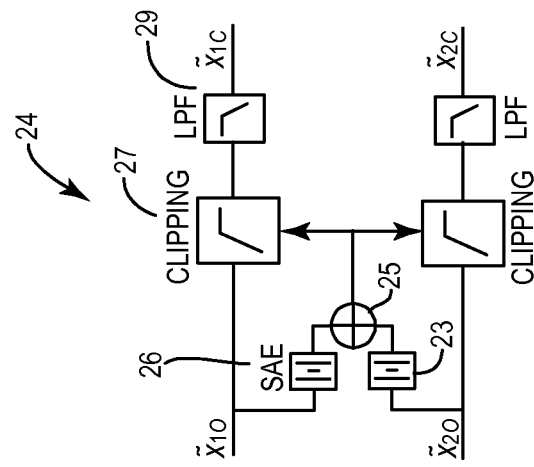
FIG. 3 is a block diagram of a crest factor reduction circuit constructed in accordance with principles of the present disclosure.
Figure 2:
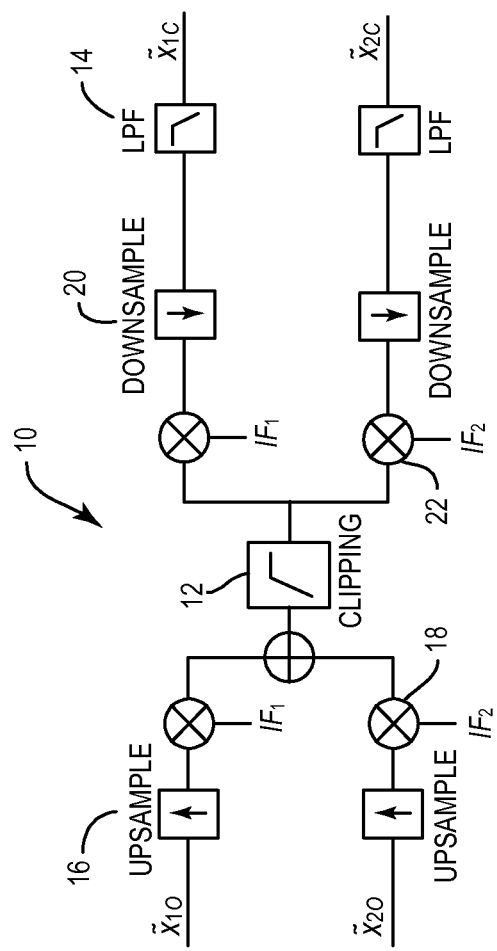
FIG. 2 is a block diagram of a known crest factor reduction circuit.

Referring now to the drawing figures, where like reference designators refer to like elements, there is shown in FIG. 3 a dual-input dual-output (DIDO) crest factor reduction (CFR) system 24, that includes a signal amplitude estimator (SAE) 26 to compute the instantaneous amplitude of the carrier aggregated signal using the baseband signals of the two carriers as a first step of the CFR process. The SAE 26 may be implemented using various types of hardware, including but not limited to application specific integrated circuitry, a digital signal processor or by a processor executing programmatic software to carry out the processing functions described herein. Such programmatic software may be stored in a non-transitory memory device.

First, the envelope of the carrier aggregated signal expression given in equation (2) can be rewritten as follows:

$$\tilde{x}(t) = |\tilde{x}_1(t)|e^{j\left(\frac{\omega_1-\omega_2}{2}t+\varphi_1(t)\right)} + |\tilde{x}_2(t)|e^{j\left(\frac{\omega_2-\omega_1}{2}t+\varphi_2(t)\right)}, \quad (4)$$

where $\varphi_1(t)$ and $\varphi_2(t)$ are the instantaneous phase of $\tilde{x}_1(t)$ and $\tilde{x}_2(t)$, respectively. The terms $$\left(\frac{\omega_1-\omega_2}{2}t\right)$$

and $$\left(\frac{\omega_2-\omega_1}{2}t\right)$$

in the exponents imply an additional phase difference between $\tilde{x}_1(t)$ and $\tilde{x}_2(t)$, which occurs at much higher speed than $\phi_1(t)$ and $\phi_2(t)$. In fact, the two terms in the right side of equation (4) can be in-phase at a given instant $t_0$ before both baseband envelopes evolve noticeably, i.e.:

$$e^{j\left(\frac{\omega_1-\omega_2}{2}t_0+\varphi_1(t_0)\right)} = e^{j\left(\frac{\omega_2-\omega_1}{2}t_0+\varphi_2(t_0)\right)} = e^{j\varphi_0(t_0)}.$$

At time instant $t_0$, the carrier aggregated signal envelope is given by $\tilde{x}(t_0)=(|\tilde{x}_1(t_0)|+|\tilde{x}_2(t_0)|)e^{j\varphi_0(t_0)}$. Hence, the carrier aggregation process yields an instantaneous full constructive addition even if the two carriers' envelopes are out of phase, i.e., $|\tilde{x}(t_0)|=(|\tilde{x}_1(t_0)|+|\tilde{x}_2(t_0)|)$. The envelope of the carrier aggregated signal is therefore given by $$\text{envelope}\left(\tilde{x}_1(t)e^{j\frac{\omega_1-\omega_2}{2}t} + \tilde{x}_2(t)e^{j\frac{\omega_2-\omega_1}{2}t}\right) \cong |\tilde{x}_1(t)| + |\tilde{x}_2(t)|. \quad (5)$$

As a result, the crest factor (CF) of the carrier aggregated signal can be estimated by monitoring the magnitude of the two carriers' baseband signals. Furthermore, equation (5) suggests that the envelope of $\tilde{x}(t)$ can be obtained using the envelopes of $\tilde{x}_1(t)$ and $\tilde{x}_2(t)$ sampled at a rate $f_s=\max(f_{s1}, f_{s2})$.

$$\text{envelope}(\tilde{x}(n))\approx(|\tilde{x}_1(n)|+|\tilde{x}_2(n)|). \quad (6)$$

Thus, the envelope can be estimated as a sum of the amplitudes of the plurality of carrier signals sampled at a Nyquist rate that is a maximum of the Nyquist rates of the individual carrier signals. Since the bandwidth associated with the carrier signals is substantially less than a spacing between carrier signals, the sampling of the envelope is at a rate that is substantially less than the spacing between the carrier signals. For example, a typical bandwidth associated with a carrier signal may be 15 MHz, whereas the spacing between carrier signals may be 300 MHz. Sampling at the Nyquist rate based on the bandwidth associated with a carrier signal would result in sampling at a rate of about 30 MHz, which is substantially less than a sampling rate of 330 MHz, i.e., less than the sampling rate by an order of 10, based on spacing between carrier signals. The amplitudes are computed by magnitude operators 23 and the sum of the amplitudes of the plurality of carrier signals is obtained by an adder 25. The magnitude operators 23 and the adder 25 for computing the expression of equation (6) may be referred to collectively as a signal amplitude estimator (SAE) or signal amplitude calculator 26.

Thus, one embodiment is an apparatus for reducing a crest factor of inter-band carrier aggregated signals, the inter-band carrier aggregated signals comprising a plurality of carrier signals. The apparatus includes a plurality of signal amplitude calculators 26, one for each of the plurality of carrier signals. Each of the plurality of signal amplitude calculators 26 is configured to calculate an amplitude of a corresponding carrier signal of the plurality of carrier signals. The adder 25 is configured to add the calculated carrier signal amplitudes to produce a composite signal that is an estimate of an envelope of the plurality of carrier signals. A plurality of clippers 27, one for each of the plurality of carrier signals, are configured to perform a clipping operation on a respective one of the plurality of carrier signals. Low pass filters 29 reduce out-of-band spectrum regrowth. Note that although FIG. 3 shows functionality for crest factor reduction of only two bands, embodiments may provide crest factor reduction for signals with three or more bands by direct extension of the principles described with reference to FIG. 3.

Figure 4:
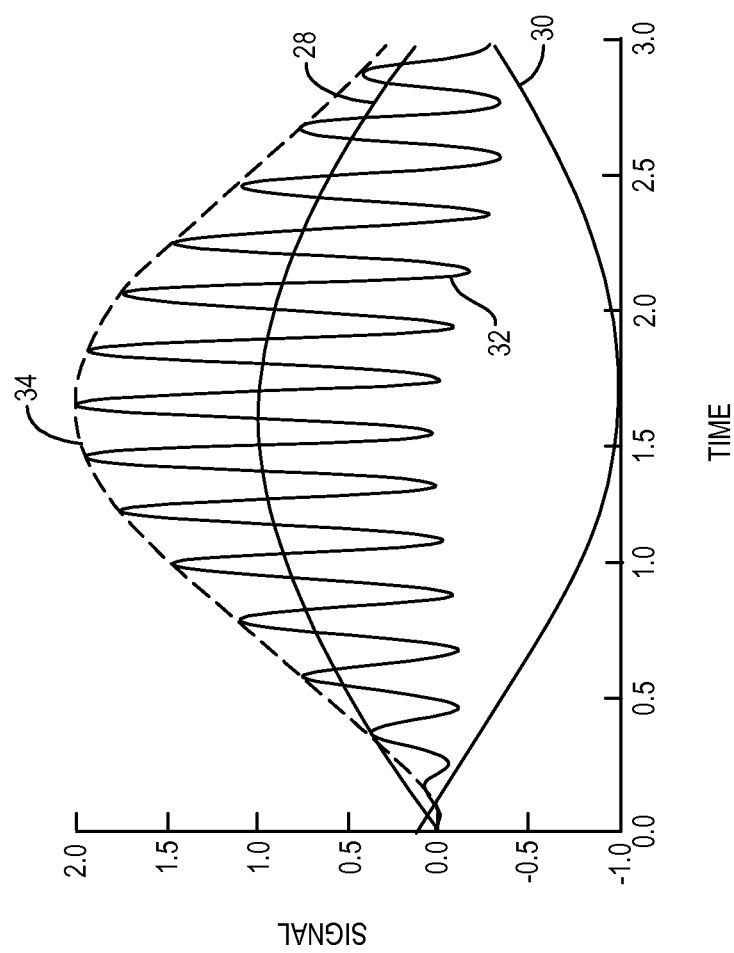
FIG. 4 is a graph of two carrier signals and the signal resulting from their combination.

FIG. 4 shows two sine waves 28 and 30 that are combined to produce a resulting signal 32. The summation of the two magnitudes of the two sine waves 28 and 30 provide a good estimate of an envelope 34 of the resulting carrier aggregated signal 32. Hence, given an arbitrary clipping threshold C, the CFR of a carrier aggregated signal composed of two carriers with respective envelopes $\tilde{x}_1(n)$ and $\tilde{x}_2(n)$ can be obtained by clipping each carrier baseband signal as follows:

$$\text{If } |\tilde{x}_1(n)| + |\tilde{x}_2(n)| > C \quad (7)$$

$$|\tilde{x}_{1\_clipped}(n)| = \frac{|\tilde{x}_1(n)|}{|\tilde{x}_1(n)| + |\tilde{x}_2(n)|} \cdot C$$

$$\Rightarrow$$

$$|\tilde{x}_{2\_clipped}(n)| = \frac{|\tilde{x}_2(n)|}{|\tilde{x}_1(n)| + |\tilde{x}_2(n)|} \cdot C$$

The clipping function may be performed by a clipper 27 for each carrier signal. The clipping may be performed, for example, by application specific integrated circuitry, or other combinations of hardware and/or software described above. The CFR of equation (7) is referred to herein as two component carrier crest factor reduction (2CC-CFR) with proportional peak reduction.

In another embodiment, given an arbitrary clipping threshold C, and a carrier aggregate signal peak S, $S=|\tilde{x}_1(n)|+|\tilde{x}_2(n)|$, where $\tilde{x}_1(n)$ and $\tilde{x}_2(n)$ are the envelopes of the two component carriers, define the threshold exceed variable E as $E=S-C$, the CFR can be implemented by subtracting half of the threshold exceeding $$\left(\text{i.e., } \frac{E}{2} = \frac{S-C}{2}\right)$$

from the magnitude of each of the two component carriers, as given in equation (8).

$$\text{If } (S = |\tilde{x}_1(n)| + |\tilde{x}_2(n)|) > C \quad (8)$$

$$=> \begin{array}{l} |\tilde{x}_{1\_clipped}(n)| = |\tilde{x}_1(n)| - (S-C)/2 \\ |\tilde{x}_{2\_clipped}(n)| = |\tilde{x}_2(n)| - (S-C)/2 \end{array}$$

The clipping function of equation (8) may be performed by a clipper 27 for each carrier signal. The clipping may be performed, for example, by application specific integrated circuitry, or other combinations of hardware and/or software described above. The CFR of equation (8) is referred to herein as 2CC-CFR with equal peak reduction per component carrier.

The power of each component carrier of a two component carrier aggregated signal can be significantly different to accommodate the radio link requirements. If $P_1$ and $P_2$ represent the average power levels of the two component carriers, the 2CC-CFR techniques of equations (7) and (8) can be applied to their scaled envelop signals, $G_1\tilde{x}_1(n)$ and $G_2\tilde{x}_2(n)$, where $$G_1 = \sqrt{\frac{P_1}{\text{mean}(|\tilde{x}_1(n)|^2/100)}}$$

-continued and $$G_2 = \sqrt{\frac{P_2}{\text{mean}(|\tilde{x}_2(n)|^2/100)}}.$$

Figure 5:
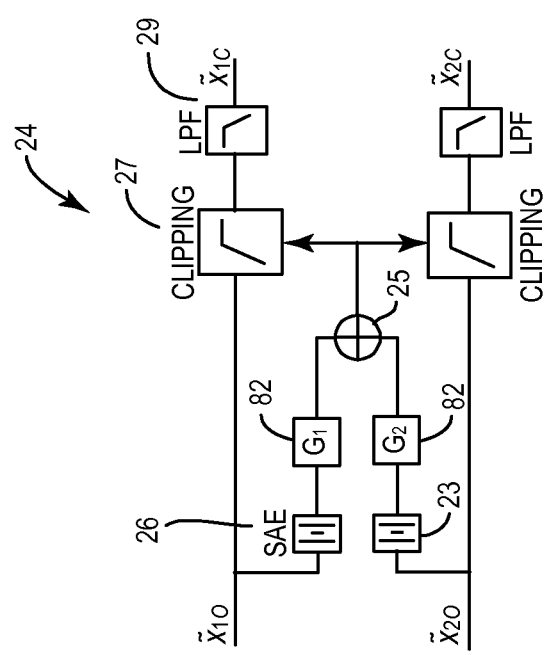
FIG. 5 is a block diagram of a crest factor reduction circuit constructed in accordance with principles of the present disclosure.

In one embodiment, the SAE 26 further includes weighting circuits, or functions, 82 that operate to apply the weights $G_1$ and $G_2$ to the instantaneous amplitudes of the corresponding component carriers output by the magnitude operators 23, as illustrated in FIG. 5. The clippers 27 then provide a CFR scheme that clips the component carriers if the sum of the weighted instantaneous amplitudes of the component carriers is greater than the predefined clipping threshold C. Specifically, in one embodiment, the CFR system 24 performs 2CC-CFR with proportional peak reduction for two component carriers having unequal power levels as follows:

$$\text{If } (G_1 \cdot |\tilde{x}_1(n)| + G_2 \cdot |\tilde{x}_2(n)|) > C \quad (9)$$

$$|\tilde{x}_{1\_clipped}(n)| = \frac{G_1 \cdot |\tilde{x}_1(n)|}{G_1 \cdot |\tilde{x}_1(n)| + G_2 \cdot |\tilde{x}_2(n)|} \cdot C$$

$$\Rightarrow$$

$$|\tilde{x}_{2\_clipped}(n)| = \frac{G_2 \cdot |\tilde{x}_2(n)|}{G_1 \cdot |\tilde{x}_1(n)| + G_2 \cdot |\tilde{x}_2(n)|} \cdot C$$

Note that in the case of equal power levels for the two bands, equation (9) could be simplified to equation (7). The CFR of equation (9) is referred to herein as 2CC-CFR with proportional peak reduction for two component carriers having unequal power levels.

Likewise, in another embodiment, the CFR system 24 operates to estimate the peaks of the carrier aggregated signal and perform 2CC-CFR with equal peak reduction per component carrier for component carriers having unequal power as follows:

$$\text{If } (S = G_1 \cdot |\tilde{x}_1(n)| + G_2 \cdot |\tilde{x}_2(n)|) > C \quad (10)$$

$$\Rightarrow \Rightarrow \Rightarrow \begin{array}{l} |\tilde{x}_{1\_clipped}(n)| = G_1 \cdot |\tilde{x}_1(n)| - (S-C)/2 \\ |\tilde{x}_{2\_clipped}(n)| = G_2 \cdot |\tilde{x}_2(n)| - (S-C)/2 \end{array}$$

Note that in the case of equal power levels for the two bands, equation (10) could be simplified to equation (8). The CFR of equation (10) is referred to herein as 2CC-CFR with equal peak reduction for two CCs having unequal power levels.

In some carrier aggregation scenarios, different component carriers may have different modulation schemes that impose different error vector magnitude (EVM) requirements. One example is a carrier aggregated signal formed by one quadrature phase shift keying (QPSK) signal and one 64 quadrature amplitude modulated (64 QAM) signal. As per ETSI TS 136 104, "Evolved Universal Terrestrial Radio Access (E-UTRA); Base Station (BS) radio transmission and reception (3GPP TS 36.104 version 11.3.1 Release 11)," V11.3.1, February 2013, the maximum tolerable EVM distortion is 17.5% for the former signal and 8% for the later signal. The 2CC-CFR solution in equation (10) applies the same peak reduction factor to the two component carriers, whereas the 2CC-CFR solution in equation (11) below does not adapt to the signals EVM requirements, but in their contribution to the aggregated peak.

Hence, in both equation (7) and (8), the clipping margin is limited by the lower EVM bound (8% in this example). A better approach is to exploit the extra EVM margin offered by the simpler modulation scheme through unequal peak reduction factors, as given by equation (11).

$$\text{If } (S = |\tilde{x}_1(n)| + |\tilde{x}_2(n)|) > C \quad (11)$$

$$\Rightarrow \begin{array}{l} |\tilde{x}_{1\_clipped}(n)| = |\tilde{x}_1(n)| - \alpha_1 \cdot (S-C) \\ |\tilde{x}_{2\_clipped}(n)| = |\tilde{x}_2(n)| - \alpha_2 \cdot (S-C) \end{array}$$

In equation (11), $a_1$ and $a_2$ are the two peak reduction factors and satisfy the condition $a_1 + a_2 = 1$. Note that in equation (11), the computation of the peak reduced envelops, $\tilde{x}_{1\_clipped}(n)$ and $\tilde{x}_{2\_clipped}(n)$ involves both $a_1$ and $a_2$, however, the peak estimator remains the same as in equation (11), i.e., $a_1$ and $a_2$ are not needed in the peak estimation. The values of $a_1$ and $a_2$ are jointly varied until the two EVM requirements are met. The CFR of equation (11) is referred to herein as 2CC-CFR with equal peak reduction scaled for different component carrier EVM requirements.

Notably, while the techniques for CFR for component carriers having unequal average power levels and CFR for component carriers having different EVM requirements are described separately above, the two techniques may be combined to provide CFR for component carriers having unequal average power levels and different EVM requirements as follows. Again, if $P_1$ and $P_2$ represent the average power levels of the two component carriers, the proposed CFR technique can be applied to their scaled envelope signals, $G_1 \tilde{x}_1(n)$ and $G_2 \tilde{x}_2(n)$, where $$G_1 = \sqrt{\frac{P_1}{\text{mean}(|\tilde{x}_1(n)|^2/100)}}$$

and $$G_2 = \sqrt{\frac{P_2}{\text{mean}(|\tilde{x}_2(n)|^2/100)}}.$$

The peak estimation of the carrier aggregated signal and the 2CC-CFR with unequal power levels and different EVM requirements can be implemented as follows:

$$\text{If } (S = G_1 \cdot |\tilde{x}_1(n)| + G_2 \cdot |\tilde{x}_2(n)|) > C \quad (12)$$

$$\Rightarrow \begin{array}{l} |\tilde{x}_{1\_clipped}(n)| = G_1 \cdot |\tilde{x}_1(n)| - \alpha_1 \cdot (S-C) \\ |\tilde{x}_{2\_clipped}(n)| = G_2 \cdot |\tilde{x}_2(n)| - \alpha_2 \cdot (S-C). \end{array}$$

In equation (12), $a_1$ and $a_2$ are the two peak reduction factors and satisfy the condition $a_1 + a_2 = 1$. Note that in equation (12), the computation of the peak reduced envelopes, $\tilde{x}_{1\_clipped}(n)$ and $\tilde{x}_{2\_clipped}(n)$, involves both $a_1$ and $a_2$. The values of $a_1$ and $a_2$ are jointly varied until the two EVM requirements are met.

Note that the results for two carriers described above can be extended straightforwardly to more than two carriers. A carrier aggregated signal over multi-bands is given by:

$$x(t) = \sum_{i=1}^{N} x_i(t) = Re\left(\sum_{i=1}^{N} \tilde{x}_i(t)e^{j\omega_i t}\right),$$

where N is the number of carrier aggregated bands, x(t) is the carrier aggregated signal, $x_i(t)$ is the mixed mode signals in the $i^{th}$ band, and $\tilde{x}_i(t)$ denotes the baseband envelopes of $x_i(t)$ around the angular frequency $\omega_i$.

In order to clip the signal x(t) by conventional means, it may be modeled as one envelope signal around a carrier angular frequency $\omega_0$ given by a middle point of the two spectrum extremes:

$$\omega_0 = \frac{1}{2}(\max(\omega_i; i = 1 \ldots N) + \min(\omega_i; i = 1 \ldots N)).$$

In this case, the sampling rate of the signal should be $$f'_s \geq 2 \cdot \left(S + \max\left(\frac{B_i}{2}\right)\right),$$

where $f'_s$ is the required sampling rate for the mixed signal, $$S = \frac{1}{2 \cdot \pi} \cdot (\max(\omega_i; i = 1 \ldots N) - \min(\omega_i; i = 1 \ldots N)),$$

and $B_i$ is the bandwidth of signal $\tilde{x}_i(t)$. Alternatively, it can be shown that, $$\text{envelope}(x(t)) \cong \sum_{i=1}^{N} |\tilde{x}_i(t)|.$$

As a result, the CF of the carrier aggregated signal can be estimated by monitoring the magnitude of the different carriers' baseband signals. The envelope of $\tilde{x}(t)$ can be obtained using the envelopes of $\tilde{x}_i(t)$ sampled at a rate $$f_s = \max\left(f_{(s_i)} = \frac{1}{B_i}; i = 1 \ldots N\right),$$

where $B_i$ is the bandwidth of signal $|x_i(t)|$.

Hence, given an arbitrary clipping threshold C, the CFR of a carrier aggregated signal using proportional peak reduction can be obtained by clipping each carrier baseband signal as follows:

$$\forall k \in \{1 \ldots N\}, \quad (13)$$

$$\text{if } \sum_{i=1}^{N} |\tilde{x}_i(t)| > C \Rightarrow |\tilde{x}_{k\_clipped}(n)| = \frac{|\tilde{x}_k(n)|}{\sum_{i=1}^{N} |\tilde{x}_i(t)|} \cdot C.$$

For the case of a tri-band signal, the tri-input tri-output CFR with proportional peak reduction is implemented as:

$$\text{If } |\tilde{x}_1(n)| + |\tilde{x}_2(n)| + |\tilde{x}_3(n)| > C \quad (14)$$

$$|\tilde{x}_{1\_clipped}(n)| = \frac{|\tilde{x}_1(n)|}{|\tilde{x}_1(n)| + |\tilde{x}_2(n)| + |\tilde{x}_3(n)|} \cdot C$$

$$= > |\tilde{x}_{2\_clipped}(n)| = \frac{|\tilde{x}_2(n)|}{|\tilde{x}_1(n)| + |\tilde{x}_2(n)| + |\tilde{x}_3(n)|} \cdot C$$

$$|\tilde{x}_{3\_clipped}(n)| = \frac{|\tilde{x}_3(n)|}{|\tilde{x}_1(n)| + |\tilde{x}_2(n)| + |\tilde{x}_3(n)|} \cdot C$$

Similarly, given an arbitrary clipping threshold C, the CFR of a carrier aggregated signal having an arbitrary number (N) of component carriers with unequal power levels can be obtained by clipping each carrier baseband signal as follows. If $P_i$ represents the average power levels of the $i^{th}$ component carriers, the proposed CFR technique can be applied to its scaled envelope signals, $G_i\tilde{x}_i(n)$, where $$G_i = \sqrt{\frac{P_i}{\text{mean}(|\tilde{x}_i(n)|^2/100)}}.$$

The peak estimation of the carrier aggregated signal and the multiple component carrier CFR (MCC-CFR) with unequal power levels can be implemented as follows:

$$\forall k \in \{1 \ldots N\}, \text{If } \left(S = \sum_{i=1}^{N} G_i \cdot |\tilde{x}_i(t)|\right) > C \quad (15)$$

$$= > |\tilde{x}_{k\_clipped}(n)| = \frac{G_k \cdot |\tilde{x}_k(t)|}{S} \cdot C$$

Similarly, given an arbitrary clipping threshold C, the CFR of a carrier aggregated signal having an arbitrary number (N) of component carriers with unequal power levels and different EVM requirements can be obtained by clipping each carrier baseband signal as follows. If $P_i$ represents the average power levels of the $i^{th}$ component carriers, the proposed CFR technique can be applied to its scaled envelope signals, $G_i\tilde{x}_i(n)$, where $$G_i = \sqrt{\frac{P_i}{\text{mean}(|\tilde{x}_i(n)|^2/100)}}.$$

The peak estimation of the carrier aggregated signal and the MCC-CFR with unequal power levels and different EVM requirements can be implemented as follows:

$$\forall k \in \{1 \ldots N\}, \text{If } \left(S = \sum_{i=1}^{N} G_i \cdot |\tilde{x}_i(t)|\right) > C \quad (16)$$

$$= > |\tilde{x}_{k\_clipped}(n)| = G_k \cdot |\tilde{x}_k(n)| - \alpha_k \cdot (S - C)$$

In equation (16), $a_k$ is the peak reduction factor for the component carrier $\tilde{x}_k(n)$. The peak reduction factors, $a_1, \ldots, a_N$, satisfy the condition $\Sigma_{i=1}^{N} a_i = 1$ and are jointly varied until the EVM requirements of the different component carriers are met. Note that while equation (16) gives a CFR technique for multiple component carrier (MCC) with unequal power levels and different EVM requirements, it can be easily modified to provide MCC-CFR for unequal power levels (i.e., by removing the $a_k$ term or to provide MCC-CFR for different EVM requirements (i.e., by removing the $G_k$ term.

Figure 6:
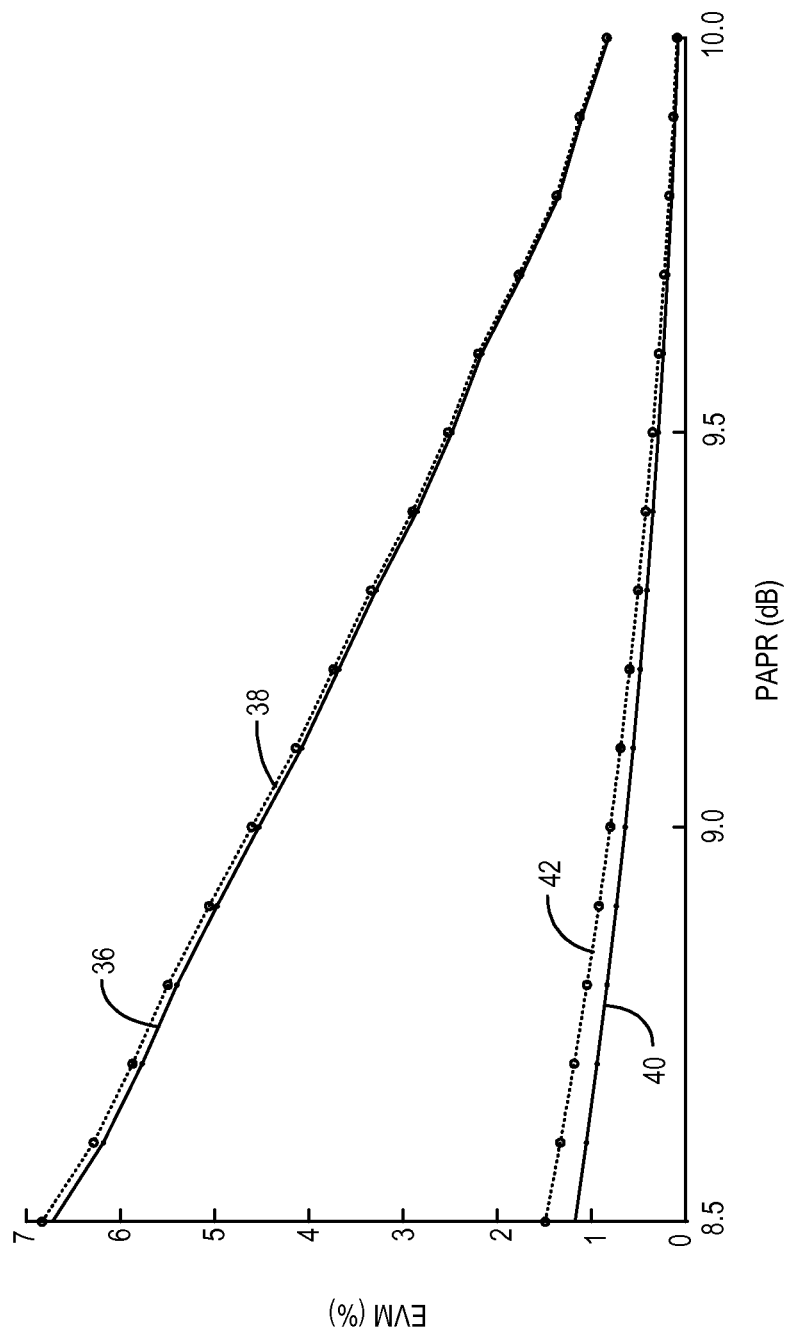
FIG. 6 is a graph of experimental error vector magnitude (EVM) performance for a single-input single-output (SISO) crest factor reduction circuit and a dual-input dual-output (DIDO) crest factor reduction circuit.
Figure 7:
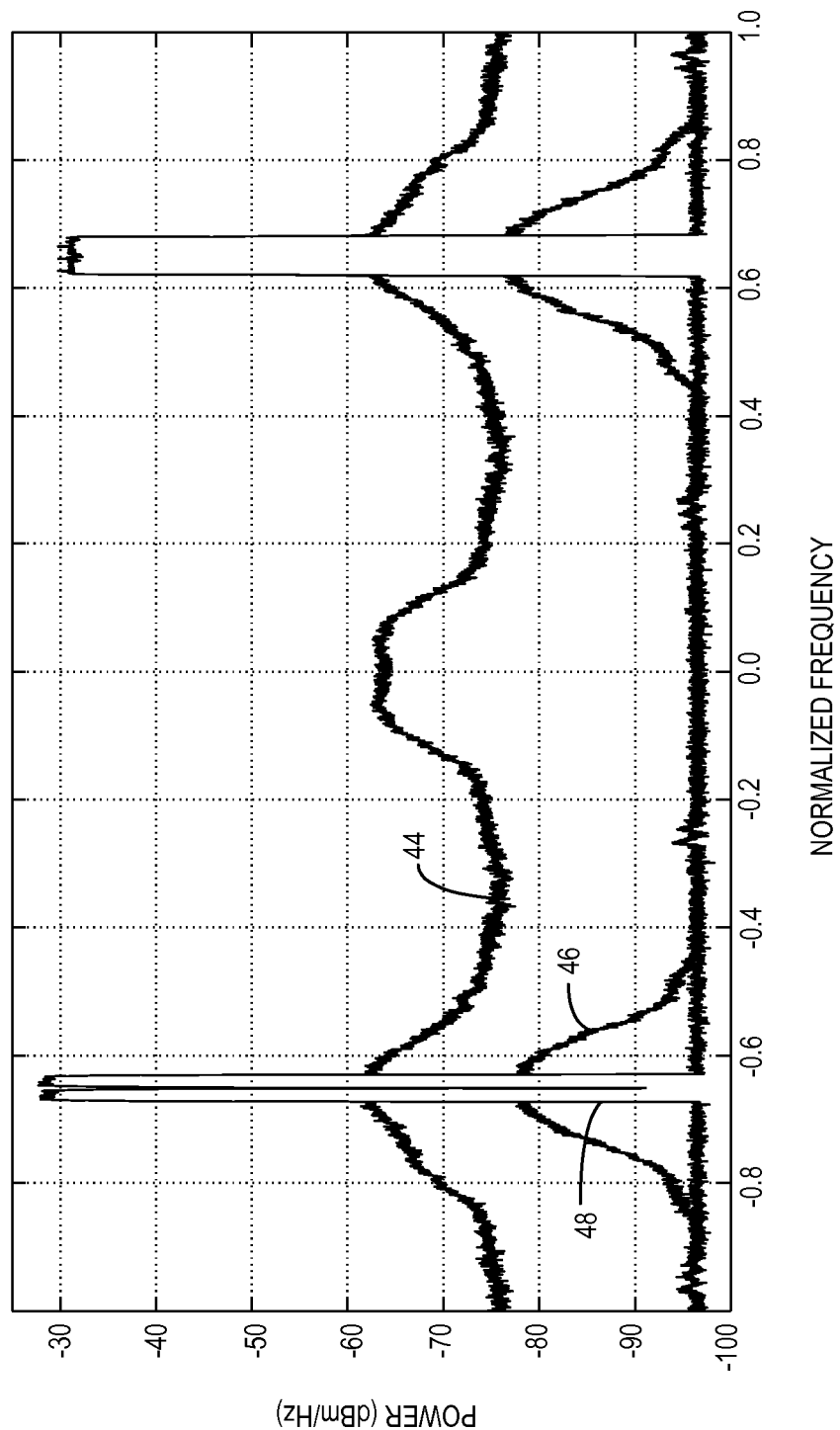
FIG. 7 is a graph of power output of crest factor reduction circuits for SISO and DIDO.

To test the 2CC-CFR technique for proportional peak reduction of equation (7) described above, an inter-band carrier aggregated signal was synthesized, composed of a 10 MHz 2C wideband code division multiple access (WCDMA) signal and a 15 MHz long term evolution (LTE) signal, separated by 300 MHz. Both the DIDO and the single-input single-output (SISO) CFR approaches were applied to the synthesized carrier aggregated signal. The SISO CFR technique was carried out at a sampling frequency equal to $f'_s=610$ MHz. Next, the DIDO CFR technique was applied to the two separate baseband components and was performed at a sampling frequency equal to $f_s=92.16$ MHz. EVM performance of the two approaches vs. targeted peak to average power ratio (PAPR) is shown in FIG. 6 and spectrum regrowth due to the nonlinear clipping operation is shown in FIG. 7. FIG. 6 shows the EVM performance for band 1 with SISO CFR 36, EVM performance for band 2 with SISO CFR 38, EVM performance for band 1 with DIDO CFR 40 and EVM performance for band 2 with DIDO CFR 42. Clearly, using the CFR methods described herein result in a substantial reduction in EVM. Similarly, FIG. 7 shows power versus frequency for SISO CFR 44, DIDO CFR 46, and DIDO CFR with filtering 48. Clearly, the CFR methods described herein result in substantial reduction of out of band signals arising due to distortion.

In order to remove the out of band spectrum regrowth of the DIDO CFR 46, the clipped signal is filtered by a filtering/windowing process 29. Filtering results are given by the DIDO CFR with filtering curve 48. It is noted that the filtering is not applied to the SISO CFR due to its poor performance. Table 1 summarizes the original signal characteristics and the results of the DIDO CFR with and without filtering. The PAPR of the original frequency aggregated signal is decreased from 10.5 dB to 9 dB with around 0.7% EVM. The clipping/windowing iterations enable the removal of the spectrum regrowth at the cost of increasing the EVM to 1.3%, which is still acceptable by different modulation schemes, e.g., binary phase shift keying (BPSK), QPSK, etc.

TABLE 1

| | Signal | PAPR (dB) | EVM (%) | ACLR (dBc) |
|---|---|---|---|---|
| Original signal | 2C WCDMA @ band 1 | 7.9 | 0 | 68 |
| | LTE15 @ band 2 | 9.2 | 0 | 65 |
| | Frequency aggregated | 10.5 | | |
| Clipped signal | 2C WCDMA @ band 1 | 7.9 | 0.6 | 48 |
| | LTE15 @ band 2 | 9.2 | 0.8 | 50 |
| | Frequency aggregated | 9 | | |
| Clipped & filtered signal | 2C WCDMA @ band 1 | 7.9 | 1.3 | 68 |
| | LTE15 @ band 2 | 9.2 | 1.3 | 65 |
| | Frequency aggregated | 9.1 | | |

Figure 8:
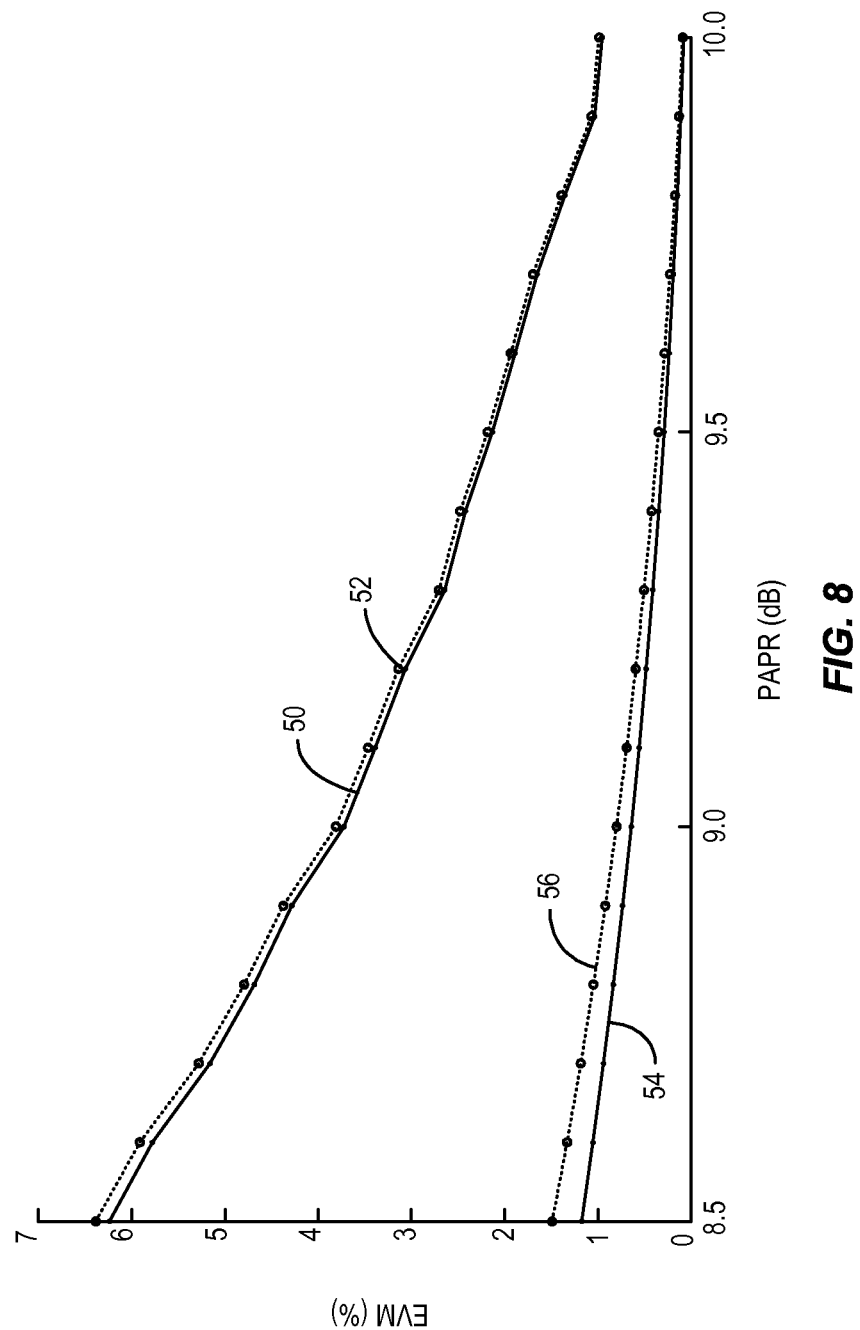
FIG. 8 is a graph of experimental EVM performance for a SISO and DIDO crest factor reduction circuits.
Figure 9:
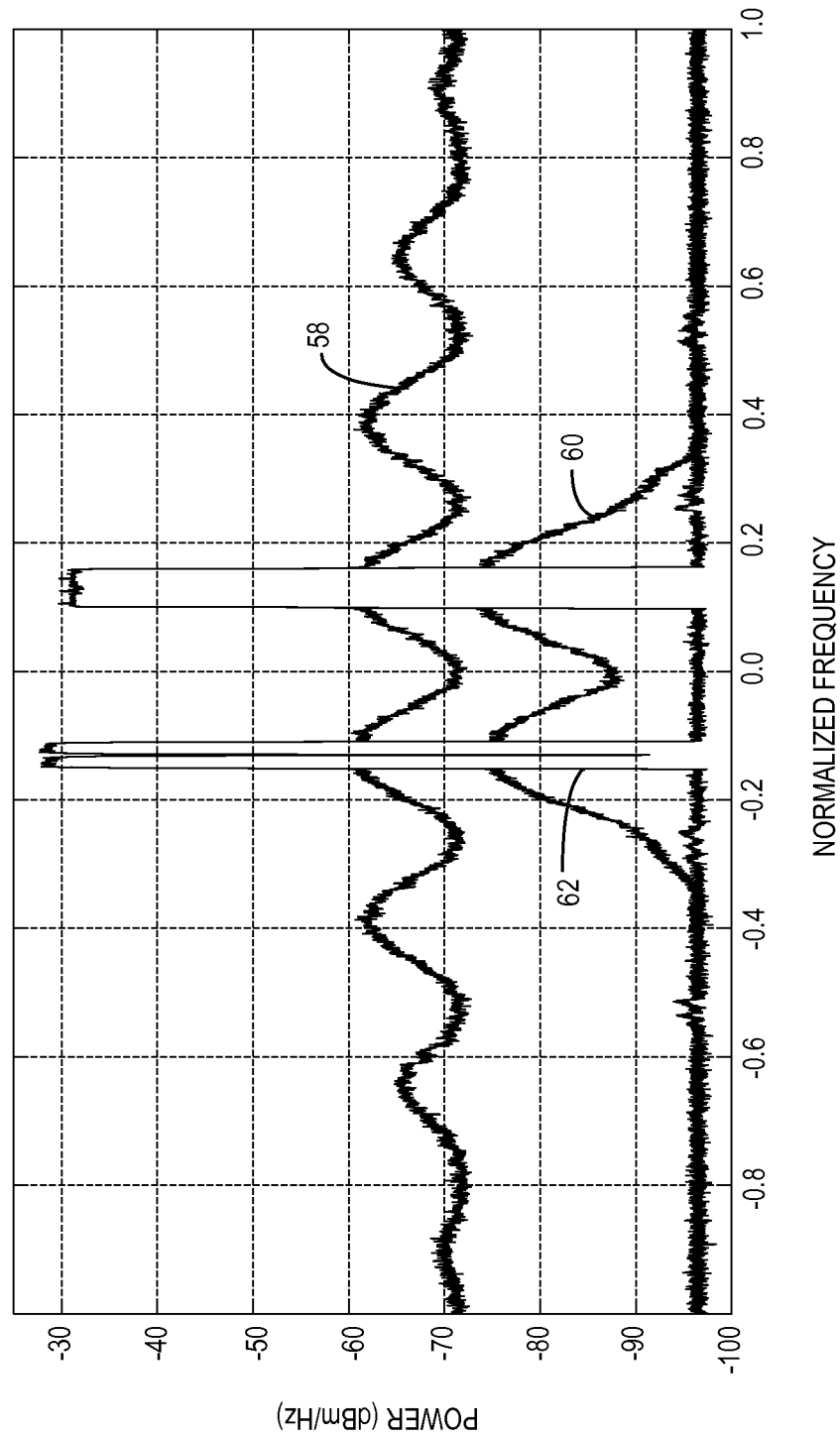
FIG. 9 is a graph of power output of crest factor reduction circuits for SISO and DIDO.

Concerning the SISO CFR performance, in addition to its high sampling rate of up to five times the Nyquist rate of the input signal, it is shown in FIG. 6 and FIG. 7 that EVM and spectrum regrowth is significantly poor when compared to the DIDO CFR case. The EVM performance of the two approaches vs. targeted PAPR is shown in FIG. 8 and spectrum regrowth due to the nonlinear clipping operation is shown in FIG. 9. FIG. 8 shows EVM for band 1 with SISO CFR 50, EVM for band 2 with SISO CFR 52, EVM for band 1 with DIDO CFR 54 and DIDO for band 2 with DIDO CFR 56. FIG. 9 shows power versus frequency for SISO CFR 58, DIDO CFR 60 and DIDO CFR with filtering 62.

The original, clipped, and clipped and filtered signal characteristics for the synthesized inter-band carrier aggregated signals discussed above are shown below in Table 2. Although the results are comparable with the high frequency separation case, the spectrum plot of the SISO CFR signal 58 in FIG. 9 reveals the existence of intermodulation distortion components due to the nonlinear clipping operation acting on the two signals simultaneously. This is unlike the DIDO CFR case 60, 62, where each signal is clipped separately. Hence, the SISO technique generates more distortion, both in-band and out of band.

TABLE 2

| | Signal | PAPR (dB) | EVM (%) | ACLR (dBc) |
|---|---|---|---|---|
| Original signal | 2C WCDMA @ band 1 | 7.9 | 0 | 68 |
| | LTE15 @ band 2 | 9.2 | 0 | 65 |
| | Frequency aggregated | 10.4 | | |
| Clipped signal | 2C WCDMA @ band 1 | 7.9 | 0.9 | 45 |
| | LTE15 @ band 2 | 9.2 | 1.1 | 48 |
| | Frequency aggregated | 8.8 | | |
| Clipped & filtered signal | 2C WCDMA @ band 1 | 7.9 | 1.3 | 68 |
| | LTE15 @ band 2 | 9.2 | 1.4 | 65 |
| | Frequency aggregated | 9 | | |

Figure 10:
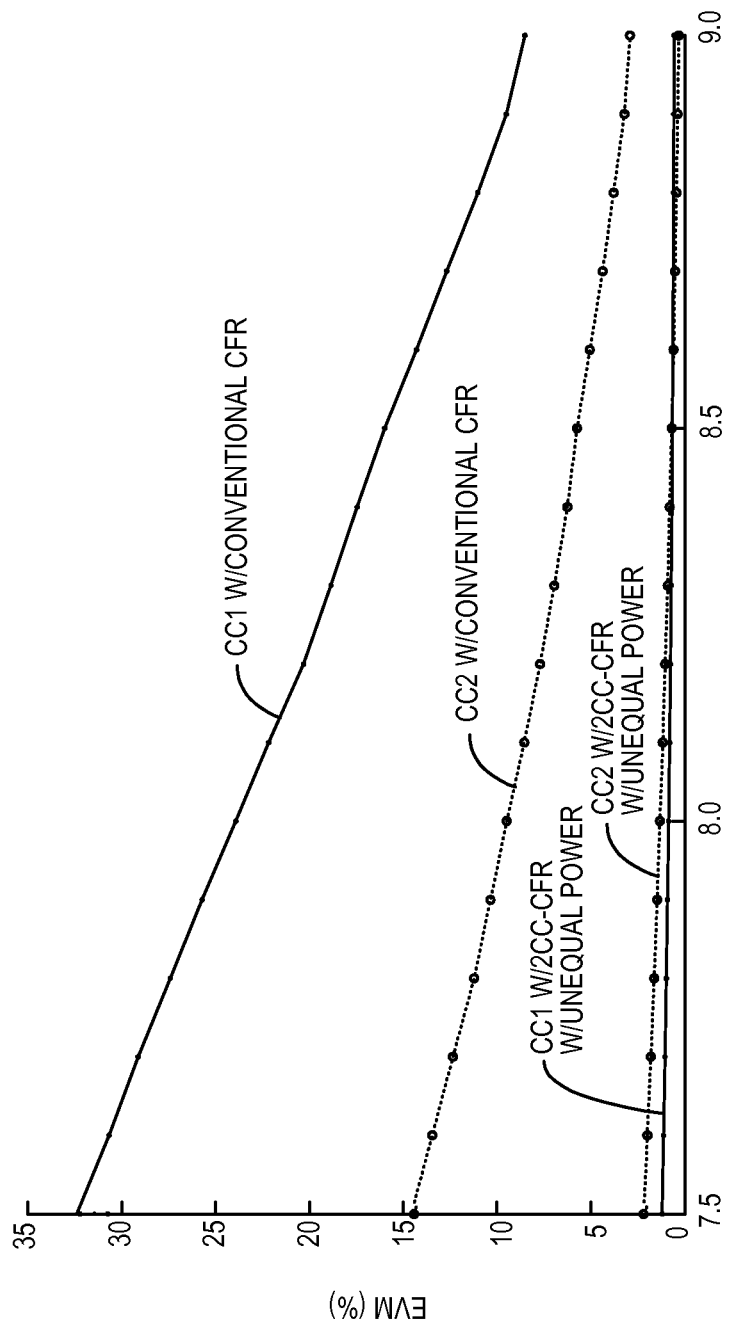
FIG. 10 is a graph of experimental EVM performance of the two component carrier crest factor reduction technique (2CC-CFR) versus that of conventional crest factor reduction (CFR) for two component carriers having unequal average power levels.
Figure 11:
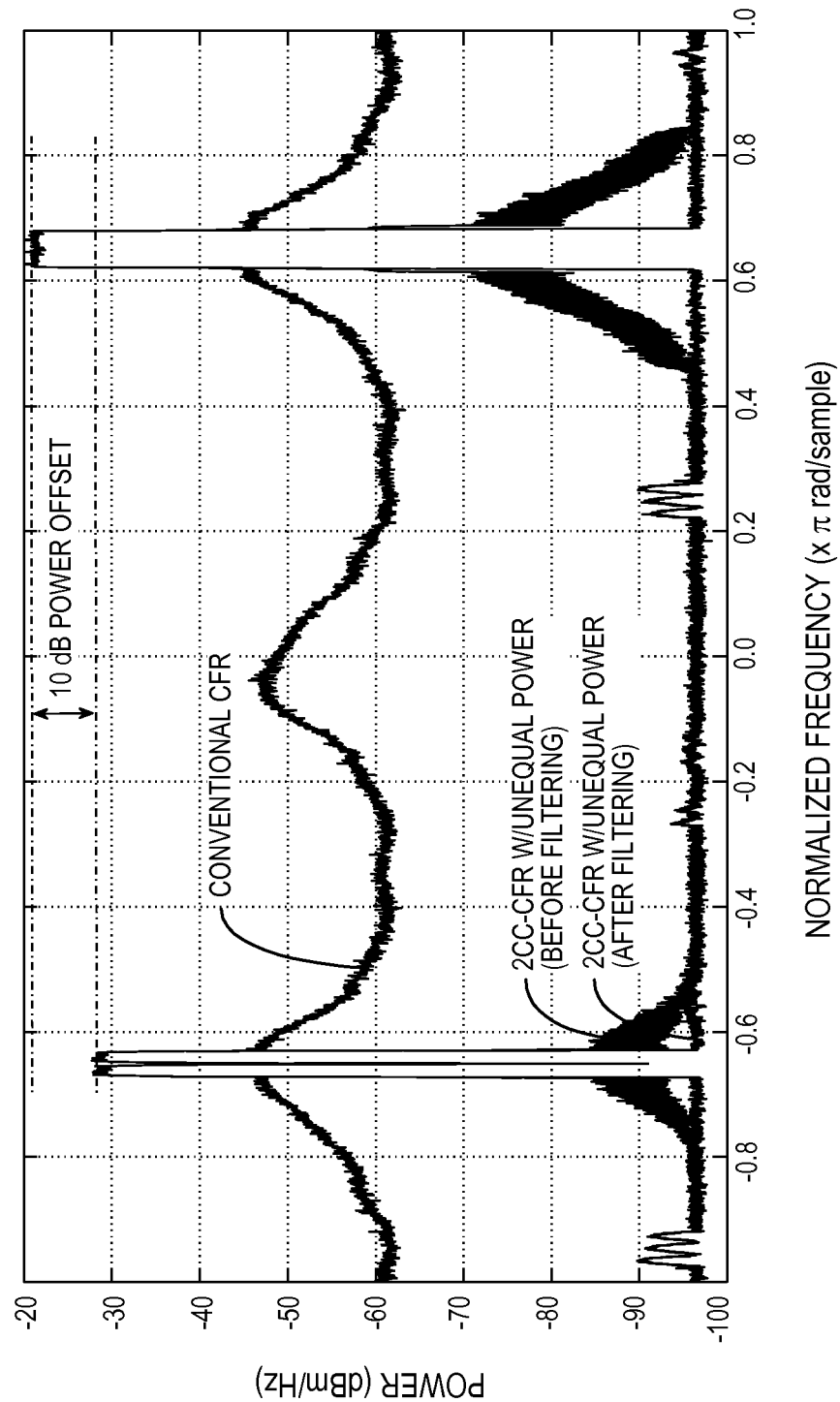
FIG. 11 is a graph illustrating experimental spectrum regrowth due to the nonlinear clipping operation when using 2CC-CFR versus the conventional CFR for two component carriers having unequal average power levels.

Embodiments are also described above for 2CC-CFR for component carriers having unequal power levels. In order to validate the particular embodiment of equation (9), a test signal composed by the same component carriers chosen above was used. However, in this case the two component carriers signals were assigned unequal average powers, i.e. the second component carrier's average power is set to be 10 dB higher than the first component carrier. Both the 2CC-CFR of equation (9) for carriers with unequal power levels and the conventional CFR approaches were applied to the synthetized carrier aggregated signal. The conventional CFR technique was carried out at a sampling frequency equal to $f'_s=610$ Msps. Next, the 2CC-CFR technique of equation (9) was applied to the two separate component carriers and was performed at a sampling frequency equal to $f_s=92.16$ Msps. The clipping/windowing iterations applied to the 2CC-CFR of equation (9) enabled the removal of the spectrum regrowth engendered by the nonlinear clipping operation at the targeted CF. EVM performance of the two approaches vs. targeted CF is shown in FIG. 10 and spectrum regrowth due to the nonlinear clipping operation is shown in FIG. 11.

Table 3 below summarizes the original signal characteristics and the results of the CFR with and without filtering. In particular, Table 3 provides PAPR and EVM of the original and peak reduced signals for the two component carriers with unequal power levels. The CF of the original frequency aggregated signal is decreased from 9.9 dB to 7.9 dB with around 1.7% and 2.7% EVM distortion, and −55 dBc and −50 dBc adjacent channel leakage power ratio (ACLR) for the first and second bands, respectively. It is found that the second band was slightly more distorted than the first band (1% higher EVM and 5 dB higher ACLR). However, in the case of the conventional CFR, as shown in FIG. 10, the first component carrier was severely distorted when compared to the second component carrier with 20% more EVM distortion and 10 dB more ACLR distortion (−15 dBc and −25 dBc ACLR for band 1 and band 2, respectively).

TABLE 3

| Signal | | PAPR (dB) | EVM (%) | ACLR (dBc) |
|---|---|---|---|---|
| Original signal | 2C WCDMA @ band 1 | 7.9 | 0 | −68 |
| | LTE15 @ band 2 | 9.2 | 0 | −65 |
| | Frequency aggregated | 9.9 | | |
| Clipped signal | 2C WCDMA @ band 1 | 7.9 | 1.7 | −45 |
| | LTE15 @ band 2 | 9.2 | 2.7 | −48 |
| | Frequency aggregated | 7.9 | | |
| Clipped & filtered signal | 2C WCDMA @ band 1 | 7.9 | 1.8 | −68 |
| | LTE15 @ band 2 | 9.2 | 2.8 | −65 |
| | Frequency aggregated | 8 | | |

Figure 12:
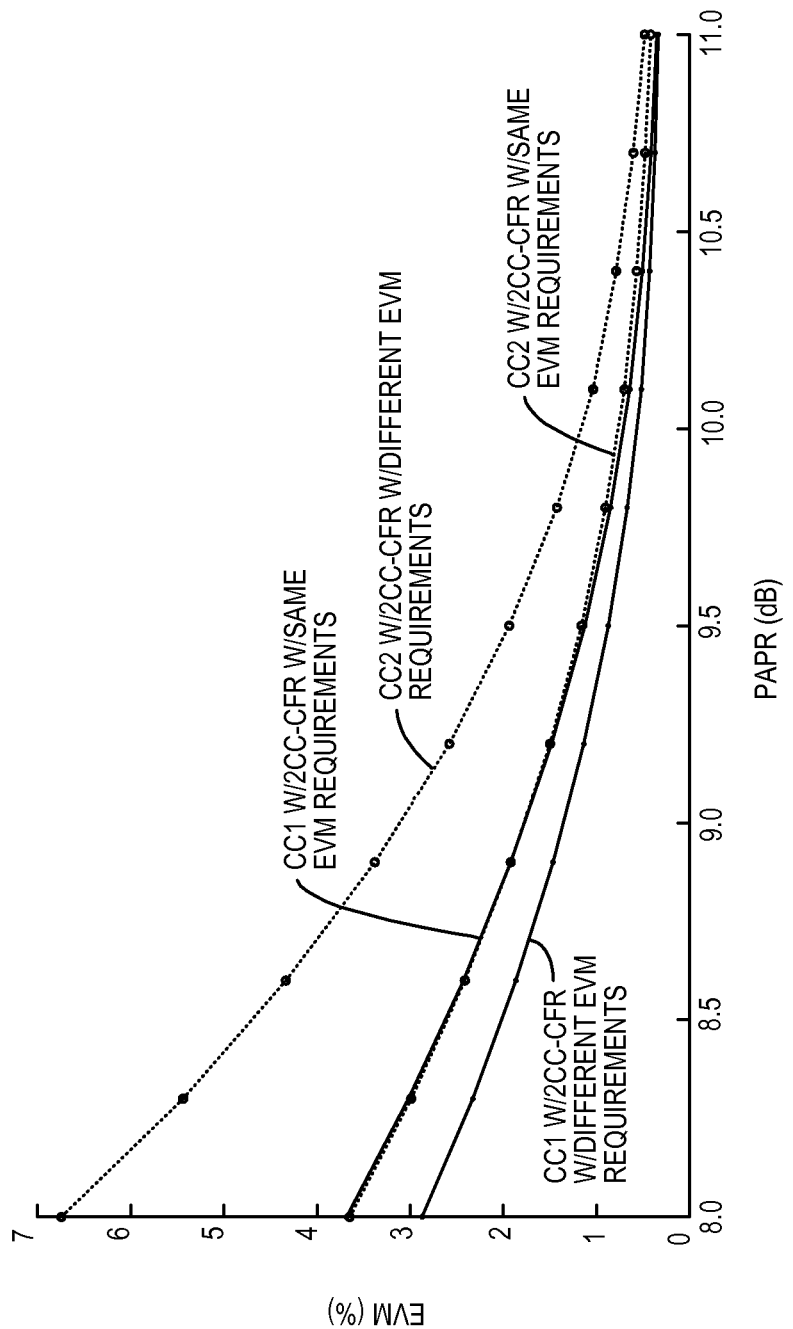
FIG. 12 is a graph of experimental EVM performance of 2CC-CFR versus that of conventional CFR for two component carriers having different EVM requirements.
Figure 13:
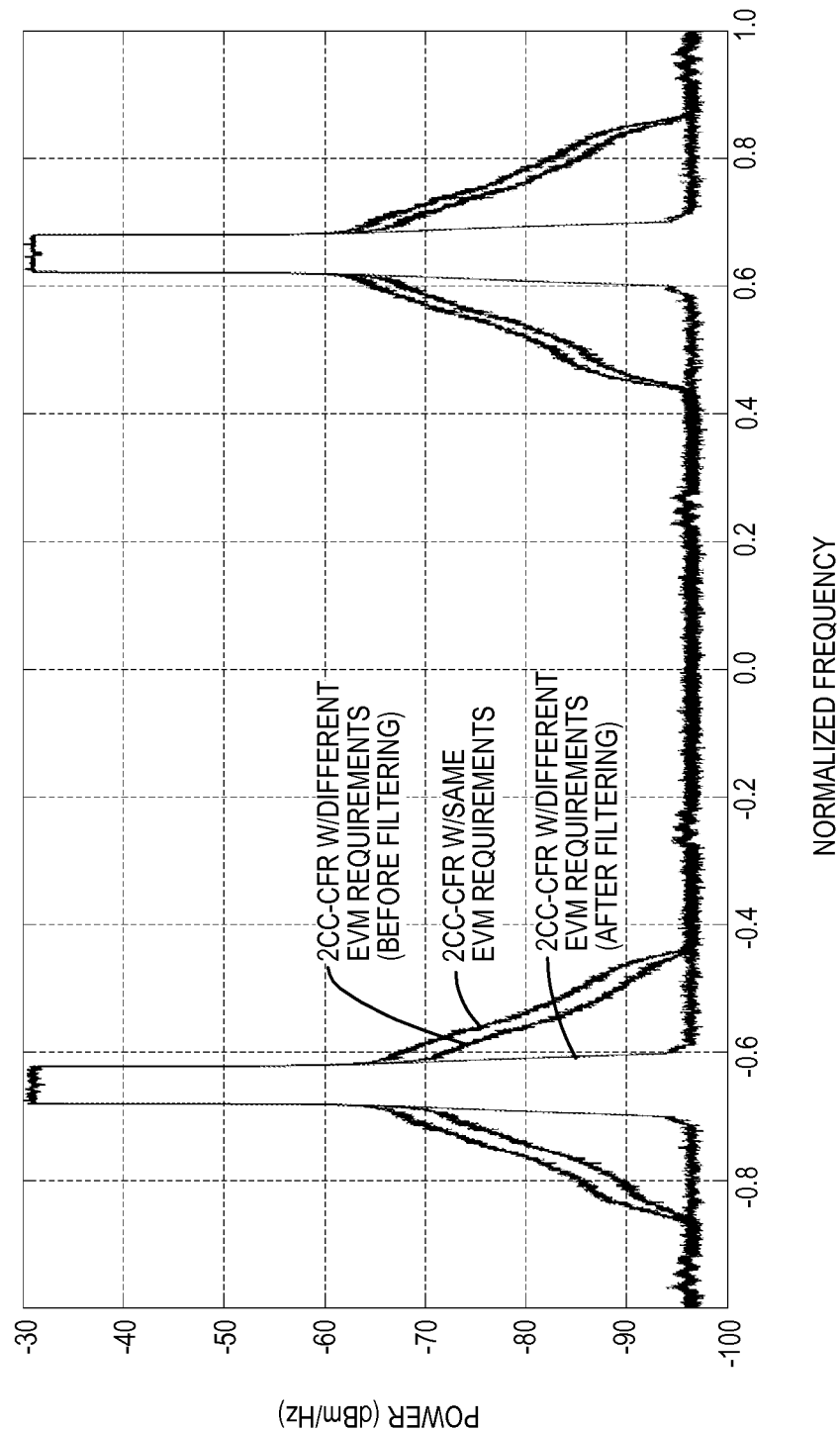
FIG. 13 is a graph illustrating experimental spectrum regrowth due to the nonlinear clipping operation when using 2CC-CFR versus the conventional CFR for two component carriers having different EVM requirements.

Embodiments are also described above for 2CC-CFR for component carriers having different EVM requirements. In order to validate the particular embodiment of equation (11), a carrier aggregated signal composed of a 15 MHz LTE 64 QAM signal and a 15 MHz LTE QPSK signal, separated by 300 MHz was synthesized. As explained above, the EVM specification for the 64 QAM signal is 8% and for the QPSK signal is 17.5%. Both the CFR for component carriers with equal EVM requirements of equation (8) and the CFR for carrier with different EVM requirements of equation (11) were applied to the synthetized carrier aggregated signal. Both 2CC-CFR techniques were applied to the two separate component carriers and were performed at a sampling frequency equal to $f_s$=92.16 Msps. In total, 4 clipping/windowing iterations were applied to enable the removal of the spectrum regrowth engendered by the nonlinear clipping operation at the targeted CF. EVM performance of the two approaches vs. targeted CF is shown in FIG. 12 and spectrum regrowth due to the nonlinear clipping operation is shown in FIG. 13.

Table 4 below summarizes the original, peak reduced, and filtered signal characteristics of the proposed CFR for component carriers with different EVM requirements. In particular, Table 4 provides PAPR and EVM of the original and peak reduced signals. The CF of the original frequency aggregated signal is decreased from 11.8 dB to 9.05 dB with around 1.4% and 3.2% EVM distortion for the first and second bands, respectively, and −67 dBc ACLR for the two component carriers, respectively. It is shown that that the QPSK signal was more distorted than the 64 QAM signal (2% higher EVM and 7 dB higher ACLR before filtering). However, in the case of the CFR with equal EVM requirements, as shown in FIG. 11, the two bands were equally distorted and the possible peak reduction is limited by the 64 QAM signal requirements.

TABLE 4

| Signal | | PAPR (dB) | EVM (%) | ACLR (dBc) |
|---|---|---|---|---|
| Original signal | 64QAM LTE @ band 1 | 11.2 | 0 | −67 |
| | QPSK LTE @ band 2 | 10.9 | 0 | −67 |
| | Frequency aggregated | 11.8 | | |
| Clipped signal | 64QAM LTE @ band 1 | | 1.4 | −33 |
| | QPSK LTE @ band 2 | | 3.2 | −40 |
| | Frequency aggregated | 9 | | |
| Clipped & filtered signal | 64QAM LTE @ band 1 | | 1.4 | −67 |
| | QPSK LTE @ band 2 | | 3.2 | −67 |
| | Frequency aggregated | 9.05 | | |

Figure 14:
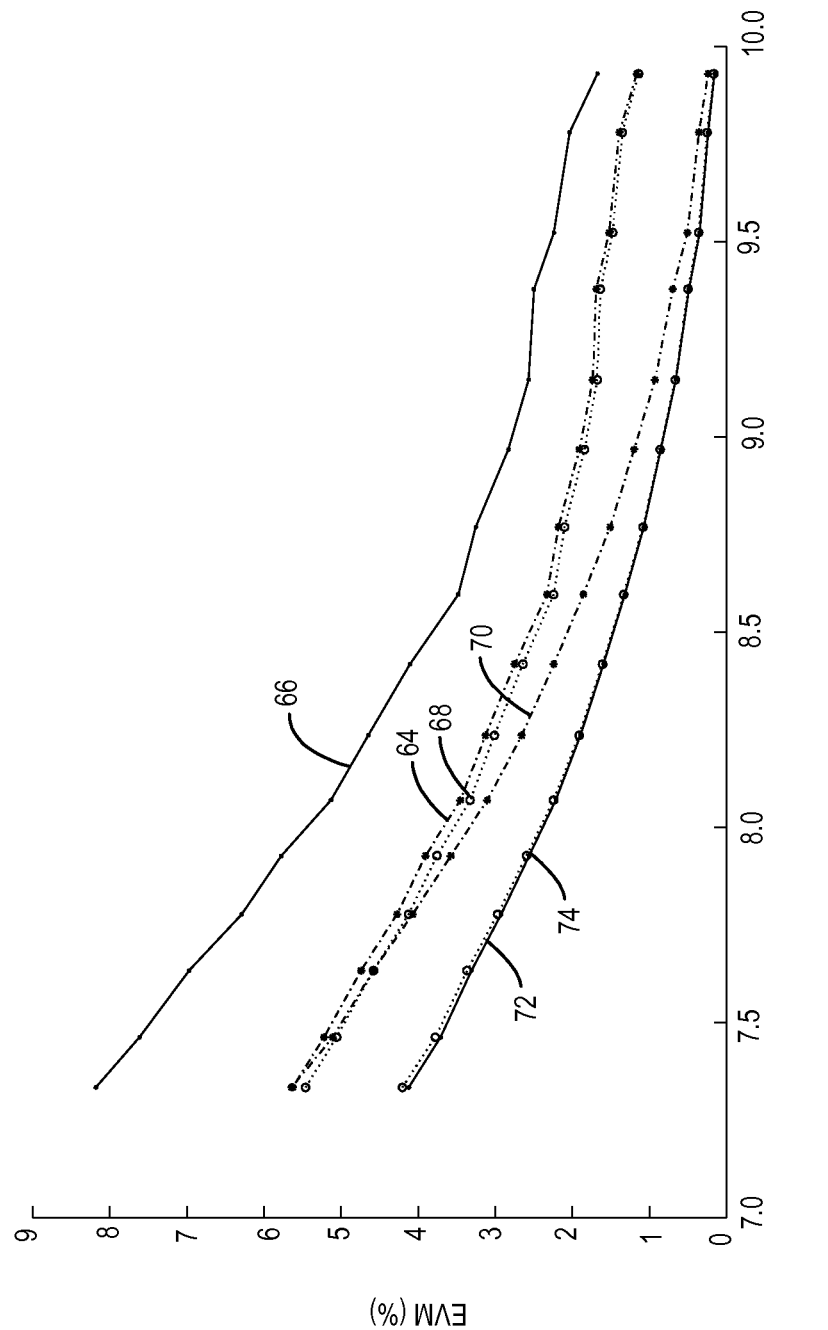
FIG. 14 is a graph of experimental EVM performance for SISO and tri-band crest factor reduction circuits.
Figure 15:
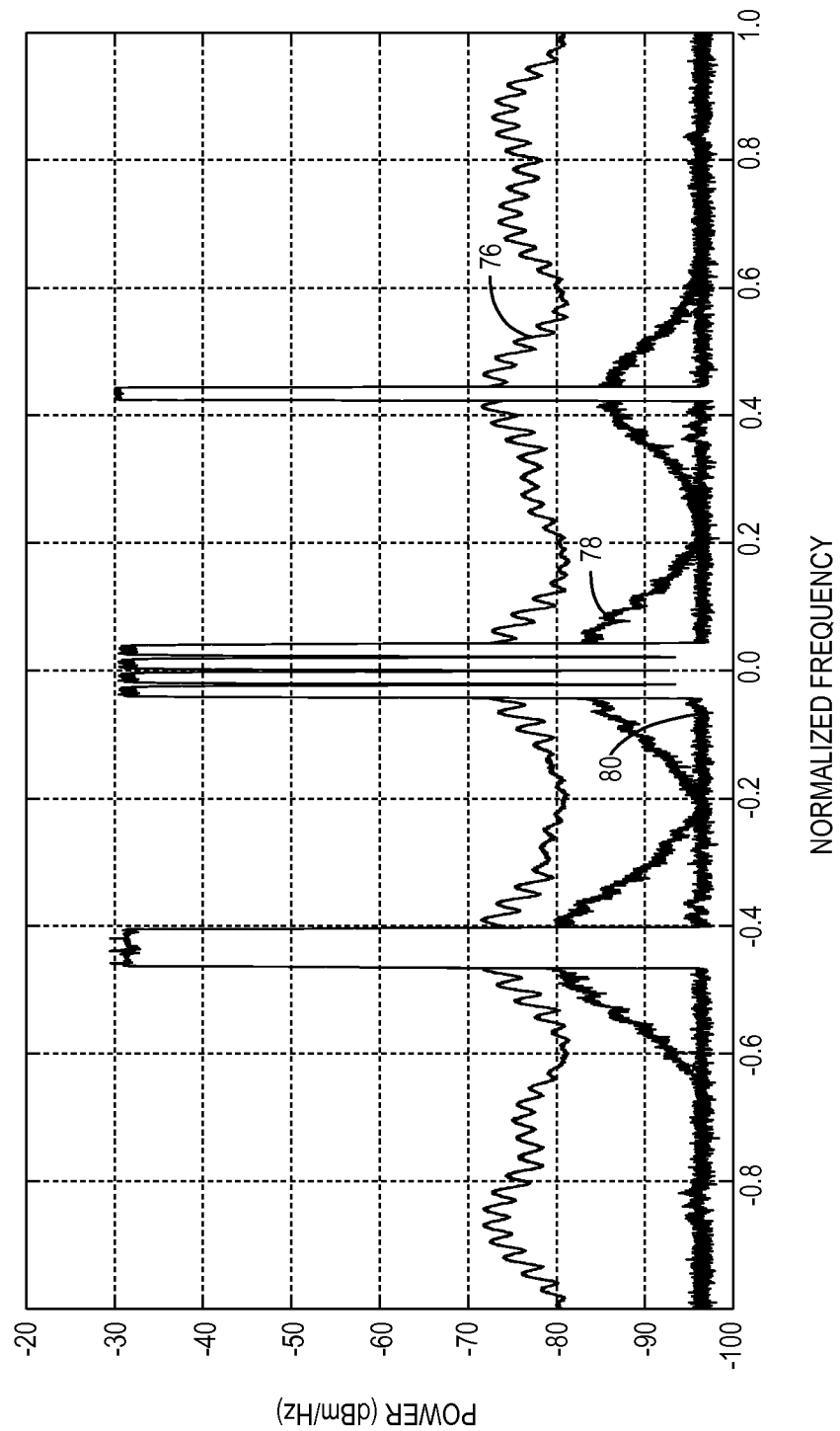
FIG. 15 is a graph of power output of crest factor reduction circuits for SISO and tri-band circuits.

Embodiments are also provided above for MCC-CFR. In this regard, in another example, an inter-band carrier aggregated signal was synthesized, composed of a 15 MHz LTE signal, a 20 MHz 2C WCDMA signal, and a 5 MHz LTE signal. The first and second signals are separated by 100 MHz. The second and third signals are separated by 100 MHz too. Hence, the overall signal separation is 200 MHz. Both the tri-band and SISO CFR approaches were applied to the synthetized carrier aggregated signal. The SISO CFR technique was carried out at a sampling frequency equal to $f'_s$=420 MHz. Next, the tri-band CFR technique was applied to the two separate baseband components and was performed at a sampling frequency equal to $f_s$=92.16 MHz. EVM performance of the two approaches vs. targeted PAPR is shown in FIG. 14 and spectrum regrowth due to the nonlinear clipping operation is shown in FIG. 15. FIG. 14 shows EVM for band 1 with SISO CFR 64, EVM for band 2 with SISO CFR 66, EVM for band 3 with SISO CFR 68, EVM for band 1 with tri-band CFR 70, EVM for band 2 with tri-band CFR 72, and EVM for band 3 with tri-band CFR 74. FIG. 15 shows power versus frequency for SISO CFR 76, tri-band CFR 78 and tri-band CFR with filtering 80.

The original and clipped signal characteristics of the synthesized tri-band carrier aggregated signals discussed above are summarized below in Table 5. It is shown that the tri-band CFR has outperformed the SISO CFR for the same reason detailed above.

TABLE 5

| Signal | | PAPR (dB) | EVM (%) | ACLR (dB) |
|---|---|---|---|---|
| Original signal | LTE15 @ band 1 | 9.2 | 0 | 65 |
| | 4C WCDMA @ band 2 | 9 | 0 | 65 |
| | LTE5 @ band 3 | 9.1 | 0 | 65 |
| | Frequency aggregated | 11.3 | | |
| Clipped signal | LTE15 @ band 1 | 9.2 | 0.6 | 48 |
| | 4C WCDMA @ band 2 | 9 | 0.7 | 51 |
| | LTE5 @ band 3 | 9.1 | 0.5 | 50 |
| | Frequency aggregated | 9.4 | | |
| Clipped & filtered signal | LTE15 @ band 1 | 9.2 | 1.3 | 65 |
| | 4C WCDMA @ band 2 | 9 | 1.4 | 65 |
| | LTE5 @ band 3 | 9.1 | 1.7 | 65 |
| | Frequency aggregated | 9.5 | | |

As an application of the technique described herein, the output signal of the CFR was applied to two power amplifiers, a 45 W Gallium Nitride (GaN) single ended power amplifier (PA) and a 250 W laterally diffused metal oxide semiconductor (LDMOS) Doherty Pa. Hence, using the threshold of 2% as a maximum tolerable EVM, the tri-band CFR allowed for about 2 dB reduction in PAPR while the SISO approach was limited to a 0.5 dB reduction in PAPR. Efficiency results are shown in Table 6. It is shown that the achieved CFR of the test signal allows for significant improvement of the effective average power level by about 2 dB, and an increase in power efficiency by up to 5% when the test signal is applied to two amplifiers under test.

TABLE 6

| | PAPR (dB) | EVM (%) Band 1 | EVM (%) Band 2 | EVM (%) Band 3 | Effective average power | Efficiency (%) |
|---|---|---|---|---|---|---|
| Single ended PA | 11.3 | 0 | 0 | 0 | | 16 |
| | 9.5 | 1.3 | 1.4 | 1.7 | +2 dB | 20 |
| Doherty PA | 11.3 | 0 | 0 | 0 | | 40 |
| | 9.5 | 1.3 | 1.4 | 1.7 | +2 dB | 45 |

A multiple input multiple output (MIMO) CFR technique suitable for inter-band multi-standard carrier aggregated signals over two and three bands has been described. Compared to the conventional SISO CFR approach, the proposed MIMO CFR allows for a significant decrease of the sampling rate which is made proportional to the maximum of the bandwidth of the two carriers rather than the spacing between them. The proposed CFR approach was demonstrated on a 300 MHz dual-band and a 200 MHz tri-band multi-standard carrier aggregated waveform composed of LTE and WCDMA signals. The CF of the aggregated signal was successfully reduced from 11.3 dB to 9.5 dB while minimizing impacts on EVM and adjacent channel power ratio (ACPR) of the output signal. Note that although examples of CFR for only two and three bands are shown herein, embodiments are not limited to two and three bands. Embodiments for CFR for more than three bands are contemplated and are a straightforward extension of the embodiments discussed herein.

Figure 16:
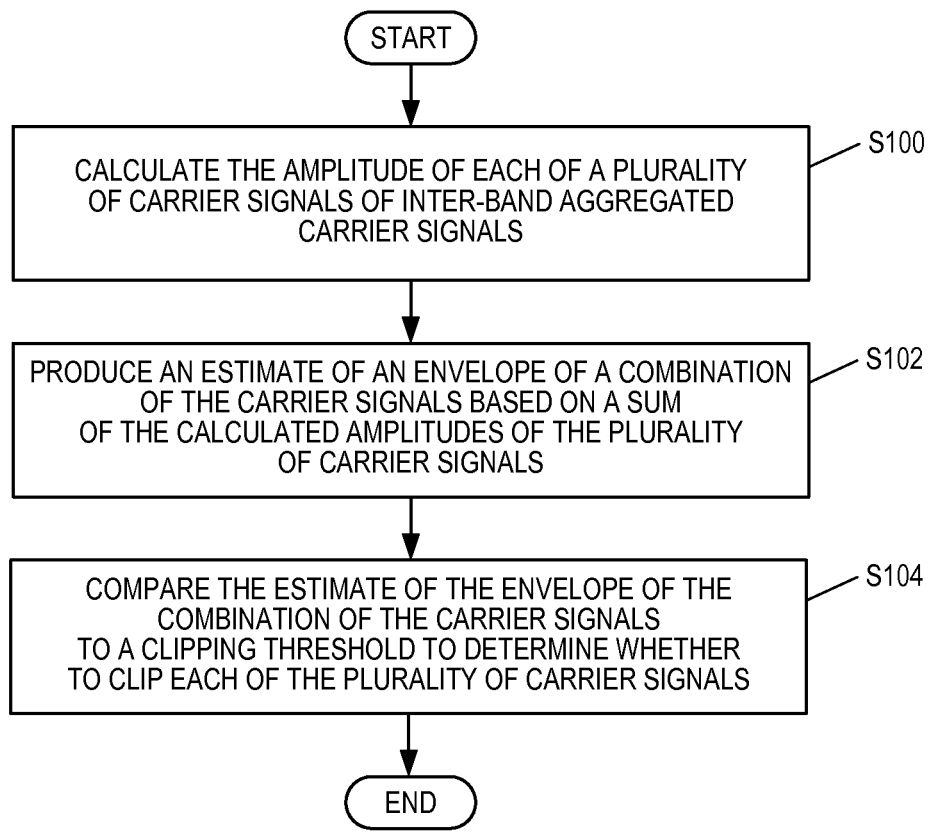
FIG. 16 is a flowchart of an exemplary process for achieving crest factor reduction according to principles of the present disclosure.
Figure 17:
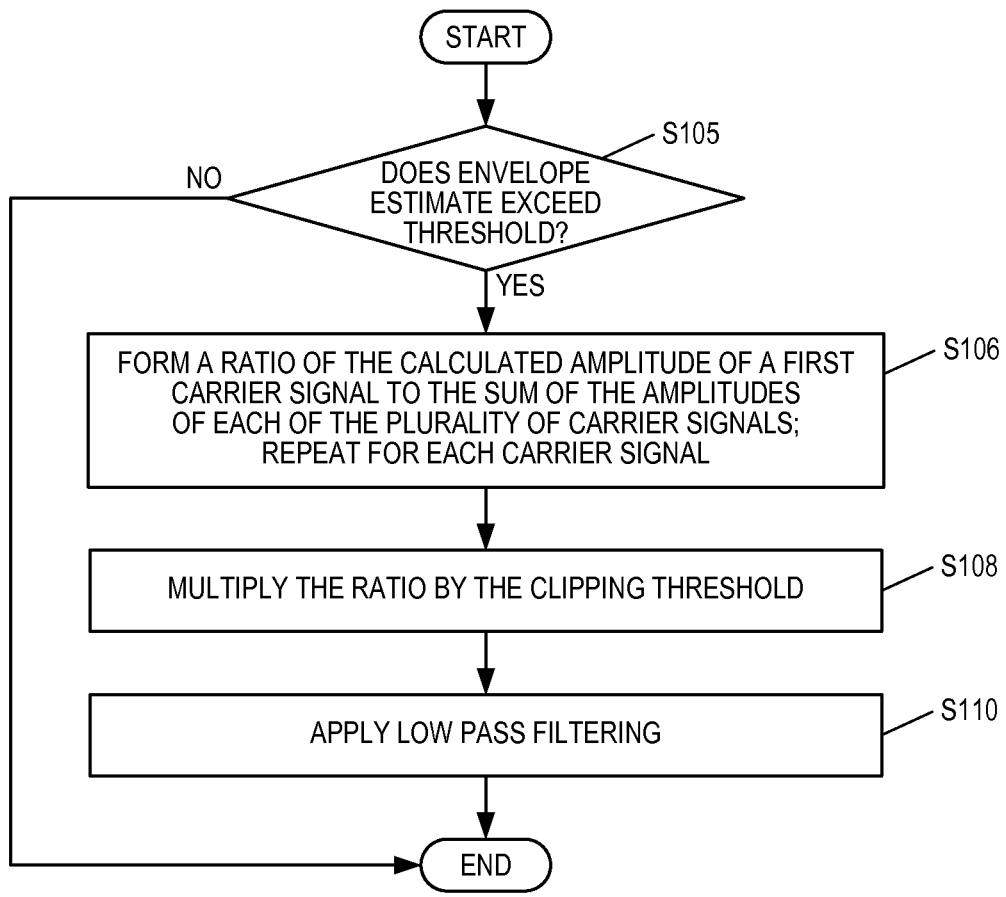
FIG. 17 is a flowchart of further steps of an exemplary process for achieving crest factor reduction according to principles of the present disclosure.

FIG. 16 is a flowchart of an exemplary process for reducing a CF of inter-band carrier aggregated signals. An amplitude of each of a plurality of carrier signals are estimated (block S100). An estimate of an envelope of a combination of the carrier signals is produced based on a sum of the estimated amplitudes of the plurality of carrier signals (block S102). As discussed above, in some embodiments, the estimate of the envelope or peak of the carrier aggregated signal is a function of the sum of the instantaneous amplitudes of the baseband representations of the component carriers. However, in other embodiments where the CFR scheme accounts for unequal average power levels of the component carriers, the instantaneous amplitudes are weighted and the weighted instantaneous amplitudes are summed to provide the estimate of the envelope or peak of the carrier aggregated signal. The estimate of the envelope of the combination of carrier signals is compared to a clipping threshold to determine whether to clip each of the plurality of carrier signals (block S104). Continuing to FIG. 17, if the envelope exceeds the clipping threshold, (block S105), then, in one embodiment, a ratio of the estimated amplitude of a first carrier signal to the sum of the amplitudes of each of the plurality of carrier signals is formed; this ratio is formed for each carrier signal (block S106). Each ratio is multiplied by the clipping threshold (block S108). A low pass filter is then applied to reduce spectral regrowth (block S110). Note that blocks S108 and S110 will vary depending on the particular embodiment.

By estimating the envelope of a combination of carrier signals based on a sum of estimated amplitudes of the individually carriers, one may determine when to clip the carrier signals using a sampling rate that is about equal to twice the bandwidth of the individual carrier signals, rather than at a sampling rate about equal to a spacing between the carrier signals.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the disclosure, which is limited only by the following claims.

The following acronyms are used throughout this disclosure.
2CC-CFR Two Component Carrier Crest Factor Reduction
64 QAM 64 Quadrature Amplitude Modulation
ACE Active Constellation Extension
ACLR Adjacent Channel Leakage Power Ratio
ACPR Adjacent Channel Power Ratio
BPSK Binary Phase Shift Keying
CF Crest Factor
CFR Crest Factor Reduction
DIDO Dual-Input Dual-Output
EVM Error Vector Magnitude
GaN Gallium Nitride
LDMOS Laterally Diffused Metal Oxide Semiconductor
LTE Long Term Evolution
MCC Multiple Component Carrier
MCC-CFR Multiple Component Carrier Crest Factor Reduction
MIMO Multiple Input Multiple Output
MSK Master Session Key
PA Power Amplifier
PAPR Peak to Average Power Ratio
QPSK Quadrature Phase Shift Keying
SAE Signal Amplitude Estimator
SISO Single-Input Single-Output
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of providing crest factor reduction for a carrier aggregated signal, comprising:
   estimating a peak of a carrier aggregated signal comprising a plurality of component carriers based on a summation of instantaneous amplitudes of baseband representations of the plurality of component carriers, the number of component carriers in the plurality of component carriers of the carrier aggregated signal is greater than or equal to 2; and
   clipping the baseband representations of the plurality of component carriers if the estimated peak of the carrier aggregated signal is greater than a predefined clipping threshold.

2. The method of claim 1 wherein estimating the peak of the carrier aggregated signal comprises:
   determining the instantaneous amplitudes of the baseband representations of the plurality of component carriers of the carrier aggregated signal; and
   summing the instantaneous amplitudes of the baseband representations of the plurality of component carriers of the carrier aggregated signal to provide the estimated peak of the carrier aggregated signal.

3. The method of claim 2 wherein clipping the baseband representations of the plurality of component carriers comprises applying equal peak reduction to each component carrier of the plurality of component carriers if the estimated peak of the carrier aggregated signal is greater than the predefined clipping threshold.

4. The method of claim 3 wherein the equal peak reduction is defined as (S−C)/2 where S is the summation of the instantaneous amplitudes of the baseband representations of the plurality of component carriers of the carrier aggregated signal and C is the predefined clipping threshold.

5. The method of claim 2 wherein clipping the baseband representations of the plurality of component carriers comprises clipping the baseband representations of the plurality of component carriers according to a crest factor reduction scheme that accounts for different Error Vector Magnitude, EVM, requirements for the plurality of component carriers if the estimated peak of the carrier aggregated signal is greater than the predefined clipping threshold.

6. The method of claim 5 wherein clipping the baseband representations of the plurality of component carriers according to the crest factor reduction scheme that accounts for different EVM requirements for the plurality of component carriers comprises clipping the baseband representations of the plurality of component carriers according to:

$$\forall k \in \{1 \ldots N\}, \text{If} \left(S = \sum_{i=1}^{N} G_i \cdot |\tilde{x}_i(t)|\right) > C$$

$$=> |\tilde{x}_{k\_clipped}(n)| = G_k \cdot |\tilde{x}_k(n)| - \alpha_k \cdot (S - C)$$

where C is the predefined clipping threshold, $\tilde{x}_{i\_clipped}(n)$ is the clipped baseband representation of the component carrier, and $a_1, \ldots, a_N$ are peak reduction factors that satisfy the condition $\Sigma_{i=1}^{n} a_i = 1$.

7. The method of claim 1 wherein estimating the peak of the carrier aggregated signal comprises:
   determining the instantaneous amplitudes of the baseband representations of the plurality of component carriers of the carrier aggregated signal;
   weighting the instantaneous amplitudes according to average power levels of the plurality of component carriers of the carrier aggregated signal; and
   summing the weighted instantaneous amplitudes of the baseband representations of the plurality of component carriers of the carrier aggregated signal to provide the estimated peak of the carrier aggregated signal.

8. The method of claim 7 wherein weighting the instantaneous amplitudes comprises, for each component carrier of the plurality of component carriers, computing the weighted instantaneous amplitude for the component carrier as:

$$G_i \cdot |\tilde{x}_i(n)|,$$

where $\tilde{x}_i(n)$ is the baseband representation of the component carrier and $G_i$ is a weighting factor for the component carrier.

9. The method of claim 8 wherein the weighting factor for the component carrier is defined as:

$$G_i = \sqrt{\frac{P_i}{\text{mean}(|\tilde{x}_i(n)|^2 / 100)}},$$

where $P_i$ is the average power level of the component carrier.

10. The method of claim 8 wherein clipping the baseband representations of the plurality of component carriers comprises clipping the baseband representations of the plurality of component carriers according to a crest factor reduction scheme that accounts for different average power levels for the plurality of component carriers if the estimated peak of the carrier aggregated signal is greater than the predefined clipping threshold.

11. The method of claim 10 wherein clipping the baseband representations of the plurality of component carriers according to the crest factor reduction scheme that accounts for different average power levels for the plurality of component carriers comprises clipping the baseband representations of the plurality of component carriers according to:

$$\forall k \in \{1 \ldots N\}, \text{If} \left(S = \sum_{i=1}^{N} G_i \cdot |\tilde{x}_i(t)|\right) > C$$

$$=> |\tilde{x}_{k\_clipped}(n)| = \frac{G_k \cdot |\tilde{x}_k(t)|}{S} \cdot C$$

where C is the predefined clipping threshold and $\tilde{x}_{i\_clipped}(n)$ is the clipped baseband representation of the component carrier.

12. The method of claim 10 wherein clipping the baseband representations of the plurality of component carriers according to the crest factor reduction scheme that accounts for different average power levels for the plurality of component carriers comprises clipping the baseband representations of the plurality of component carriers according to:

$$\forall k \in \{1 \ldots N\}, \text{If} \left(S = \sum_{i=1}^{N} G_i \cdot |\tilde{x}_i(t)|\right) > C$$

$$=> |\tilde{x}_{k\_clipped}(n)| = G_k \cdot |\tilde{x}_k(n)| - \alpha_k \cdot (S - C)$$

where C is the predefined clipping threshold and $\tilde{x}_{i\_clipped}(n)$ is the clipped baseband representation of the component carrier.

13. The method of claim 8 wherein clipping the baseband representations of the plurality of component carriers comprises clipping the baseband representations of the plurality of component carriers according to a crest factor reduction scheme that accounts for both different average power levels for the plurality of component carriers and different Error Vector Magnitude, EVM, requirements for the plurality of component carriers if the estimated peak of the carrier aggregated signal is greater than the predefined clipping threshold.

14. The method of claim 13 wherein clipping the baseband representations of the plurality of component carriers according to the crest factor reduction scheme that accounts for both different average power levels for the plurality of component carriers and different EVM requirements comprises clipping the baseband representations of the plurality of component carriers according to:

$$\forall k \in \{1 \ldots N\}, \text{If} \left(S = \sum_{i=1}^{N} G_i \cdot |\tilde{x}_i(t)|\right) > C$$

$$=> |\tilde{x}_{k\_clipped}(n)| = G_k \cdot |\tilde{x}_k(n)| - \alpha_k \cdot (S - C)$$

where C is the predefined clipping threshold, $\tilde{x}_{i\_clipped}(n)$ is the clipped baseband representation of the component carrier, and $\alpha_1, \ldots, \alpha_N$ are peak reduction factors that satisfy the condition $\Sigma_{i=1}^{N} \alpha_i = 1$.

15. A crest factor reduction system for a carrier aggregated signal, comprising:
   a signal amplitude estimator configured to estimate a peak of a carrier aggregated signal comprising a plurality of component carriers, the signal amplitude estimator configured to estimate the peak of the carrier aggregated signal based on a summation of instantaneous amplitudes of baseband representations of the plurality of component carriers, the number of component carriers in the plurality of component carriers of the carrier aggregated signal is greater than or equal to 2; and
   clipping circuitry configured to clip the baseband representations of the plurality of component carriers if the estimated peak of the carrier aggregated signal is greater than a predefined clipping threshold.

16. The system of claim 15 wherein signal amplitude estimator comprises:
   a plurality of magnitude operators configured to provide the instantaneous amplitudes of the baseband representations of the plurality of component carriers, each magnitude operator of the plurality of magnitude operators configured to provide the instantaneous amplitude of the baseband representation of a different one of the plurality of component carriers;

determining the instantaneous amplitudes of the baseband representations of the plurality of component carriers of the carrier aggregated signal; and an adder configured to sum the instantaneous amplitudes of the baseband representations of the plurality of component carriers of the carrier aggregated signal to provide the estimated peak of the carrier aggregated signal.

17. The system of claim 16 wherein the clipping circuitry configured to clip the baseband representations of the plurality of component carriers based on an equal peak reduction per component carrier scheme if the estimated peak of the carrier aggregated signal is greater than the predefined clipping threshold.

18. The system of claim 17 wherein the equal peak reduction is defined as (S−C)/2 where S the summation of the instantaneous amplitudes of the baseband representations of the plurality of component carriers of the carrier aggregated signal and C is the predefined clipping threshold.

19. The system of claim 16 wherein the clipping circuitry is configured to clip the baseband representations of the plurality of component carriers according to a crest factor reduction scheme that accounts for different Error Vector Magnitude, EVM, requirements for the plurality of component carriers if the estimated peak of the carrier aggregated signal is greater than the predefined clipping threshold.

20. The system of claim 19 wherein the clipping circuitry is configured to clip the baseband representations of the plurality of component carriers according to the crest factor reduction scheme that accounts for different EVM requirements for the plurality of component carriers by clipping the baseband representations of the plurality of component carriers according to:

$$\forall k \in \{1 \ldots N\}, \text{ If } \left(S = \sum_{i=1}^{N} G_i \cdot |\tilde{x}_i(t)|\right) > C$$
$$=> |\tilde{x}_{k\_clipped}(n)| = G_k \cdot |\tilde{x}_k(n)| - \alpha_k \cdot (S - C)$$

where C is the predefined clipping threshold, $\tilde{x}_{i\_clipped}(n)$ is the clipped baseband representation of the component carrier, and $a_1, \ldots, a_N$ are peak reduction factors that satisfy the condition $\sum_{i=1}^{N} a_i = 1$.

21. The system of claim 15 wherein signal amplitude estimator comprises:

a plurality of magnitude operators configured to provide the instantaneous amplitudes of the baseband representations of the plurality of component carriers, each magnitude operator of the plurality of magnitude operators configured to provide the instantaneous amplitude of the baseband representation of a different one of the plurality of component carriers;

determining the instantaneous amplitudes of the baseband representations of the plurality of component carriers of the carrier aggregated signal;

weighting circuitry configured to weight the instantaneous amplitudes according to average power levels of the plurality of component carriers of the carrier aggregated signal; and an adder configured to sum the weighted instantaneous amplitudes of the baseband representations of the plurality of component carriers of the carrier aggregated signal to provide the estimated peak of the carrier aggregated signal.

22. The system of claim 21 wherein, in order to weight the instantaneous amplitudes, the weighting circuitry is configured to, for each component carrier of the plurality of component carriers, compute the weighted instantaneous amplitude for the component carrier as:

$$G_i \cdot |\tilde{x}_i(n)|,$$

where $\tilde{x}_i(n)$ is the baseband representation of the component carrier and $G_i$ is a weighting factor for the component carrier.

23. The system of claim 22 wherein the weighting factor for the component carrier is defined as:

$$G_i = \sqrt{\frac{P_i}{\text{mean}(|\tilde{x}_i(n)|^2 / 100)}},$$

where $P_i$ is the average power level of the component carrier.

24. The system of claim 22 wherein the clipping circuitry is configured to clip the baseband representations of the plurality of component carriers according to a crest factor reduction scheme that accounts for different average power levels for the plurality of component carriers if the estimated peak of the carrier aggregated signal is greater than the predefined clipping threshold.

25. The system of claim 24 wherein the clipping circuitry is configured to clip the baseband representations of the plurality of component carriers according to the crest factor reduction scheme that accounts for different average power levels for the plurality of component carriers by clipping the baseband representations of the plurality of component carriers according to:

$$\forall k \in \{1 \ldots N\}, \text{ If } \left(S = \sum_{i=1}^{N} G_i \cdot |\tilde{x}_i(t)|\right) > C$$
$$=> |\tilde{x}_{k\_clipped}(n)| = \frac{G_k \cdot |\tilde{x}_k(t)|}{S} \cdot C$$

where C is the predefined clipping threshold and $\tilde{x}_{i\_clipped}(n)$ is the clipped baseband representation of the component carrier.

26. The system of claim 24 wherein the clipping circuitry is configured to clip the baseband representations of the plurality of component carriers according to the crest factor reduction scheme that accounts for different average power levels for the plurality of component carriers by clipping the baseband representations of the plurality of component carriers according to:

$$\forall k \in \{1 \ldots N\}, \text{ If } \left(S = \sum_{i=1}^{N} G_i \cdot |\tilde{x}_i(t)|\right) > C$$
$$=> |\tilde{x}_{k\_clipped}(n)| = G_k \cdot |\tilde{x}_k(n)| - (S - C)$$

where C is the predefined clipping threshold and $\tilde{x}_{i\_clipped}(n)$ is the clipped baseband representation of the component carrier.

27. The system of claim 22 wherein the clipping circuitry is configured to clip the baseband representations of the plurality of component carriers according to a crest factor reduction scheme that accounts for both different average power levels for the plurality of component carriers and different Error Vector Magnitude, EVM, requirements for the plurality of component carriers if the estimated peak of the carrier aggregated signal is greater than the predefined clipping threshold.

28. The system of claim 27 wherein the clipping circuitry is configured to clip the baseband representations of the plurality of component carriers according to a crest factor reduction scheme that accounts for both different average power levels for the plurality of component carriers and different EVM requirements by clipping the baseband representations of the plurality of component carriers according to:

$$\forall k \in \{1 \ldots N\}, \text{If } \left(S = \sum_{i=1}^{N} G_i \cdot |\tilde{x}_i(t)|\right) > C$$

$$=> |\tilde{x}_{k\_clipped}(n)| = G_k \cdot |\tilde{x}_k(n)| - \alpha_k \cdot (S - C)$$

where C is the predefined clipping threshold, $\tilde{x}_{i\_clipped}(n)$ is the clipped baseband representation of the component carrier, and $a_1, \ldots, a_N$ are peak reduction factors that satisfy the condition $\Sigma_{i=1}^{N} a_i = 1$.

* * * * *